US006209412B1

(12) United States Patent
Hiratsuna et al.

(10) Patent No.: US 6,209,412 B1

(45) Date of Patent: Apr. 3, 2001

(54) OPERATION-CONTROL LEVER UNIT FOR ENGINE-POWERED WORKING MACHINE

(75) Inventors: Kenjiro Hiratsuna; Tomomi Nakaya; Atsushi Kojima; Takashi Ikeda, all of Wako (JP)

(73) Assignee: Honda Giken Kogyo Kabushiki Kaisha (JP)

( * ) Notice: Subject to any disclaimer, the term of this patent is extended or adjusted under 35 U.S.C. 154(b) by 0 days.

(21) Appl. No.: 09/344,229

(22) Filed: Jun. 25, 1999

(30) Foreign Application Priority Data

Jun. 26, 1998 (JP) ........................................ 10-181233
Jun. 26, 1998 (JP) ........................................ 10-181235
Jun. 30, 1998 (JP) ........................................ 10-185307

(51) Int. Cl.[7] .............................. G05G 5/16; F16C 11/02

(52) U.S. Cl. ............................ 74/502.2; 74/531; 123/398

(58) Field of Search ............................... 74/502.2, 501.6, 74/531; 123/398; 56/DIG. 18

(56) References Cited

U.S. PATENT DOCUMENTS 5,517,967 * 5/1996 Nakayama ........................... 123/398
5,664,543 * 9/1997 Taomo et al. ........................ 123/400
5,765,445 * 6/1998 Miyata ................................ 74/501.6
5,826,713 * 1/1999 Tsunoda et al. ....................... 74/526
5,862,713 * 1/1999 Tsunoda et al. ....................... 74/526
5,868,377 * 2/1999 Taomo et al. .................. 74/501.6 X
6,006,627 * 12/1999 Ikeda et al. ..................... 74/501.6 X

FOREIGN PATENT DOCUMENTS 53-42661 10/1978 (JP) .
55-21536 5/1980 (JP) .
60-41539 3/1985 (JP) .
63-14035 4/1988 (JP) .
8303263 11/1996 (JP) .

* cited by examiner

*Primary Examiner*—Charles A Marmor
*Assistant Examiner*—Ankur Parekh
(74) *Attorney, Agent, or Firm*—Adams & Wilks

(57) ABSTRACT

An operation-control lever unit for regulating engine power of an engine-powered working machine to control operation of a working tool includes a throttle-lever holding mechanism operative in response to pivotal movement of a lock lever in a locking direction to frictionally hold the throttle lever at a desired position. The throttle-lever holding mechanism includes a stationary cam formed integrally with the head portion of the operator's control handle for the machine, a movable cam on the lock lever and cooperating with the stationary cam to displace the lock lever along a support shaft in a direction away from the stationary cam, and a resilient member disposed behind the movable cam and resiliently urging the movable cam toward the stationary cam.

32 Claims, 19 Drawing Sheets

OPERATION-CONTROL LEVER UNIT FOR ENGINE-POWERED WORKING MACHINE

BACKGROUND OF THE INVENTION

1. Field of the Invention

The present invention relates to an operation-control lever unit for regulating power of an engine of an engine-powered working machine to control operation of a working tool of the engine-powered working machine. The engine-powered working machine may include a carrying bush cutter, a chemical sprayer, a vacuum dust collector and so on.

2. Description of the Related Art

A carrying bush cutter having a circular cutter driven for rotation by an engine carried on the back of an operator is known from Japanese Utility Model Publication No. (SHO) 63-14035. The circular cutter is attached to one end of a hand-operating rod. The rod is provided with an operation handle near the other end thereof. In use of the known bush cutter, the operator swings the rod up and down and right and left while gripping the operation handle. With this swinging operation, bushes are cut or removed by the rotating circular cutter.

In order to control the rotational speed of the cutter, output power of the engine is regulated by a throttle lever provided on a grip portion of the operation handle. However, because the operator is forced to continue gripping of the throttle lever and the operation handle throughout the bush-removing work, a heavy work load is put on the operator.

According to somewhat successful prior improvements, a lock mechanism is associated with a throttle lever to temporarily lock the throttle lever in a desired position, so that the work load on the operator can be reduced. Typical examples of the prior improvements are disclosed in Japanese Utility Model Publication Nos. (SHO) 53-42661 and (SHO) 55-21536, Japanese Utility Model Laid-open Publication No. (SHO) 60-41539, and Japanese Patent Laid-open Publication No. (HEI) 8-303263.

According to the disclosed operation lever units, the throttle lever is displaced to a predetermined operating position, then locked in this operating position by activating the lock mechanism. The lock mechanism is released at need.

More specifically, the operation lever unit disclosed in Japanese Utility Model Publication Nos. (SHO) 55-21536 includes a throttle adjustment lever and a throttle release lever provided side by side on the operating handle. However, because these levers have different axes of pivotal movement, the operation lever unit is complicated in construction, requires an increased number of structural components, and is uneasy to manipulate. Additionally, due to wear and deformation occurring during a long period of use of the engine-powered working machine, a frictional force acting on the throttle lever to lock the same lever in position against pivotal movement tends to decrease and eventually allows the throttle lever to move from the locked position. The throttle lever may sometimes return to its original position when the operation lever unit is subjected to vibration. The operation lever unit has no means to adjust the frictional force acting on the throttle lever.

In the operation lever unit shown in Japanese Utility Model Laid-open Publication No. (SHO) 60-41539, a throttle lever and a lock lever are mounted on the same pivot pin. However, due to a strong spring force acting directly on respective pivoted portions of the levers, a great muscular effort or force is required to turn each lever. Thus, the manipulability of the operating lever unit is relatively low. If the spring force is weakened, the lock lever will fail to lock the throttle lever at a desired position with sufficient reliability.

The operation lever unit disclosed in Japanese Utility Model Publication No. (SHO) 53-42661 includes a locking pawl pivotally mounted between the pivot axis of a throttle lever and the pivot axis of a lock lever for operatively interlocking the two levers. Because of the presence of the locking pawl, the operating lever unit is complicated in construction and requires an increased number of structural components.

In the operation lever unit shown in Japanese Patent Laid-open Publication No. (HEI) 8-303263, a throttle lever and a lock lever are pivotally mounted on the same pivot pin. However, because the lock lever is normally held stationary against pivotal movement using the force of a spring only, this operation lever unit has the same problem as the operation lever unit disclosed in Japanese Utility Model Laid-open Publication No. (SHO) 60-41539 previously described.

SUMMARY OF THE INVENTION

The present invention is conceived to solve the foregoing problems associated with the prior art.

A more specific object of the present invention is to provide a operation-control lever unit for an engine-powered working machine, which includes a throttle lever, a lock lever and a throttle-lever holding mechanism of simple construction having a relatively small number of components.

Another object of the present invention is to provide an operation-control lever unit for an engine-powered working machine, which is simple in construction and is capable of reliably locking a throttle lever in a desired position to regulate output power of an engine of the engine-powered working machine while keeping good manipulability of a lock lever disposed close to the throttle lever.

To achieve the foregoing objects, an operation-control lever unit of the present invention for regulating power of an engine of an engine-powered working machine to control operation of a working tool of the engine-powered working machine includes an operation-control handle having a grip portion and an enlarged head portion at an end of the grip portion, a throttle lever pivotably mounted to the head portion of the handle and pivotally movable about its pivot axis within a predetermined angular range, a lock lever pivotably mounted by a support shaft to the head portion and pivotally movable about an axis of the support shaft, the lock lever being slidably movable along the axis of the support shaft, and a throttle-lever holding mechanism operative in response to pivotal movement of the lock lever in a locking direction to frictionally hold the throttle lever at a desired position within the predetermined angular range. The throttle-lever holding mechanism includes a first cam coaxial with the support shaft and formed integrally with the head portion of the handle, a second cam coaxial with the support shaft and provided on the lock lever, the second cam being co-active with the first cam to displace the lock lever along the support shaft in a first direction away from the first cam, and a resilient means disposed behind the second cam when viewed from the first cam and resiliently urging the second cam toward the first cam.

Because the first cam is integral with the head portion of handle, the throttle-lever holding mechanism is relatively simple in construction and has a small number of structural components.

Preferably, one of the first and second cams has an integral tubular portion coaxial with the support shaft and projecting toward the other cam. The other cam has an outer peripheral surface slidably received in the tubular portion. With this arrangement, the cams are protected against contamination with dirt and dust and can smoothly operate in response to pivotal movement of lock lever.

The first and second cams each have an annular cam surface having at least one radial ridge. At least one of the ridge of the first cam and the ridge of the second cam has a flat top surface. With this flat top surface, the throttle lever can be stably held in a locked position even when the lock lever is pivoted to some extent. The flat top surface is preferably perpendicular to the axis of the support shaft. The ridge may have a generally trapezoidal cross-sectional shape.

Preferably, the throttle-lever holding mechanism further includes a friction member disposed between the throttle lever and the lock lever and forced against the throttle lever when coaction between the first and second cams displaces the lock lever in the first direction against the resiliency of the resilient means The throttle-lever holding mechanism may also include a second friction member disposed opposite to the first-mentioned friction member with the throttle lever disposed therebetween. The first-mentioned friction member and the second friction member cooperate to grip the throttle lever therebetween when the lock lever is displaced in the first direction. The first-mentioned friction member and the second friction member are preferably rubber ring discs mounted on the support shaft.

The resilient means is disposed between the lock lever and the friction member and urges the lock lever in a second direction to move the second cam toward the first cam and also urges the friction member into contact with the throttle lever. The resilient means is preferably a conical spring washer mounted on the support shaft.

The resilient means may include a first resilient member disposed between the lock lever and the first-mentioned friction member, and a second resilient member disposed between the second friction member and a portion of the support shaft. The first resilient member urges the lock lever in a second direction to move the second cam toward the first cam and also urges the first-mentioned friction member into contact with the throttle lever. The second resilient member urges the second friction member into contact with the throttle lever.

As an alternative, the resilient means may be disposed between the lock lever and the friction member urge the lock lever in a second direction to move the second cam toward the first cam. The resilient means is operatively separated from the friction member.

In one preferred form of the invention, the resilient means is disposed between the lock lever and the friction member, and the throttle-lever holding mechanism further includes a friction adjustment device for varying a preloading on the resilient means to adjust a frictional force acting between the throttle lever and the friction member. The support shaft is a screw having a head slidably guided in a first portion of the head portion of the handle and a shank including a screw portion threaded with a second portion of the head portion. The resilient means, the friction member and the throttle lever are disposed between the head of the screw and the lock lever. The screw forms the friction adjustment device. By turning the screw, the screw moves in an axial direction. With this axial movement of the screw, the distance between the head of the screw and the lock lever varies with the result that a preloading on the resilient means is changed. Since the friction member is urged by the resilient means, the friction exerted from the friction member to the throttle lever can be adjusted by changing the proloading on the resilient means. The screw is preferably a hexagonal socket head cap screw. The friction adjustment device may further include a lock nut threaded with the screw portion of the screw to lock the screw in position against movement relative to the head portion.

The above and other objects, features and advantages of the present invention will become manifest to those versed in the art upon making reference to the following description and accompanying sheets of drawings in which preferred structural embodiments incorporating the principle of the invention are shown by way of illustrative examples.

DETAILED DESCRIPTION OF THE PREFERRED EMBODIMENTS

Figure 1:
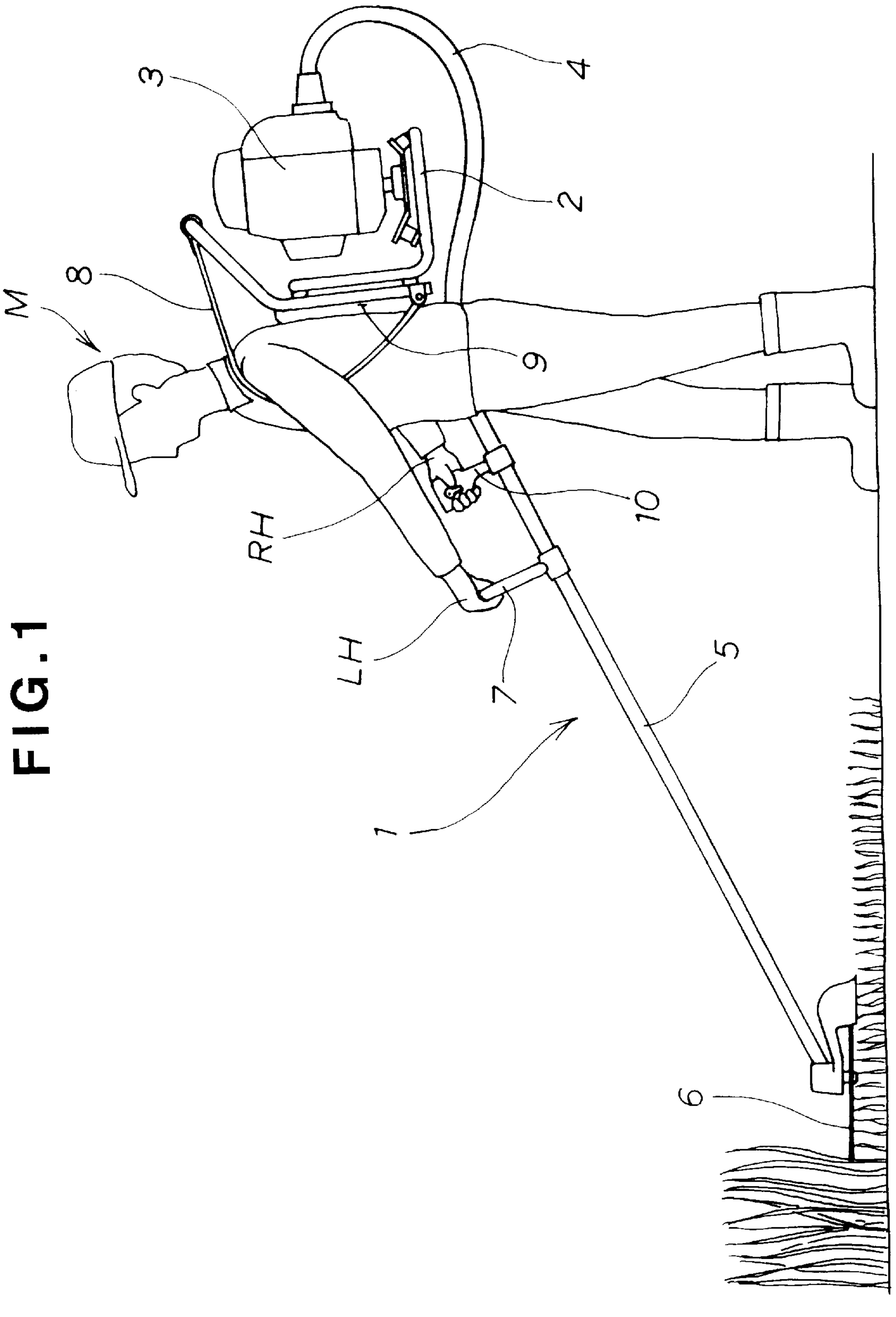
FIG. 1 is a diagrammatical view of a carrying bush cutter as it is used in a bush-removing work as an engine-powered working machine in which an operation-control lever unit according to the present invention is incorporated.

Certain preferred embodiments of the present invention will be described below in greater detail with reference to the accompanying sheets of drawings wherein like or corresponding parts are designated by the same reference characters throughout several views.

Referring now to FIG. 1, there is shown a carrying bush cutter 1 as it is used in a bush-removing work as an engine-powered working machine in which an operation-control lever unit according to the present invention is incorporated.

The carrying bush cutter 1 includes a frame 2, a power unit such as a gasoline engine 3 mounted on the frame 2, a flexible tube 4 connected at one end to a power output portion of the engine 3, an elongated rigid hollow support rod 5 having one end (proximal end) connected to the other end of the flexible tube 4, and a circular cutter (working tool) 6 rotatably attached to the other end (distal end) of the support rod 5. The circular cuter 6 is connected in driven relation to the engine 3 via a flexible power transmission shaft (not shown) extending through the support rod 6 and the flexible tube 4. Thus, the circular cutter 6 is driven in rotation by output power of the engine 3.

A grip handle 7 and an operation-control handle 10 are provided on a proximal end portion of the support rod 7. The operation-control handle 10 is disposed behind the grip handle 7 when viewed from the distal end of the support rod 5. The grip handle 7 and the operation-control handle 10 extend orthogonally from an upper surface of the support rod 3.

The frame 2 has a pair of belts or straps (one being shown in FIG. 1) for enabling the operator M to carry the engine 3 on its back, with a cushioning pad 9 disposed between the back of the operator M and the frame 2. In use of the carrying bush cutter 1, the support rod 5 is held on, for example, the right side of a body of the operator M, with the grip handle 7 and the operation-control handle 10 being gripped by the left hand LH and the right hand RH of the operator M, respectively. The support rod 5 is swung right and left and up and down about its proximal end so that bushes are cut or removed by the rotating circular cutter 6.

The left hand LH of the operator M is used essentially for gripping the grip handle 7 and moving the support rod 5 right and left and up and down. The right hand RH is used for gripping the operation-control handle 10 and performing throttle adjustment to regulate output power of the engine 3. The operation-control handle 10 constitutes a main part of the operation-control lever unit of the present invention.

Figure 2:
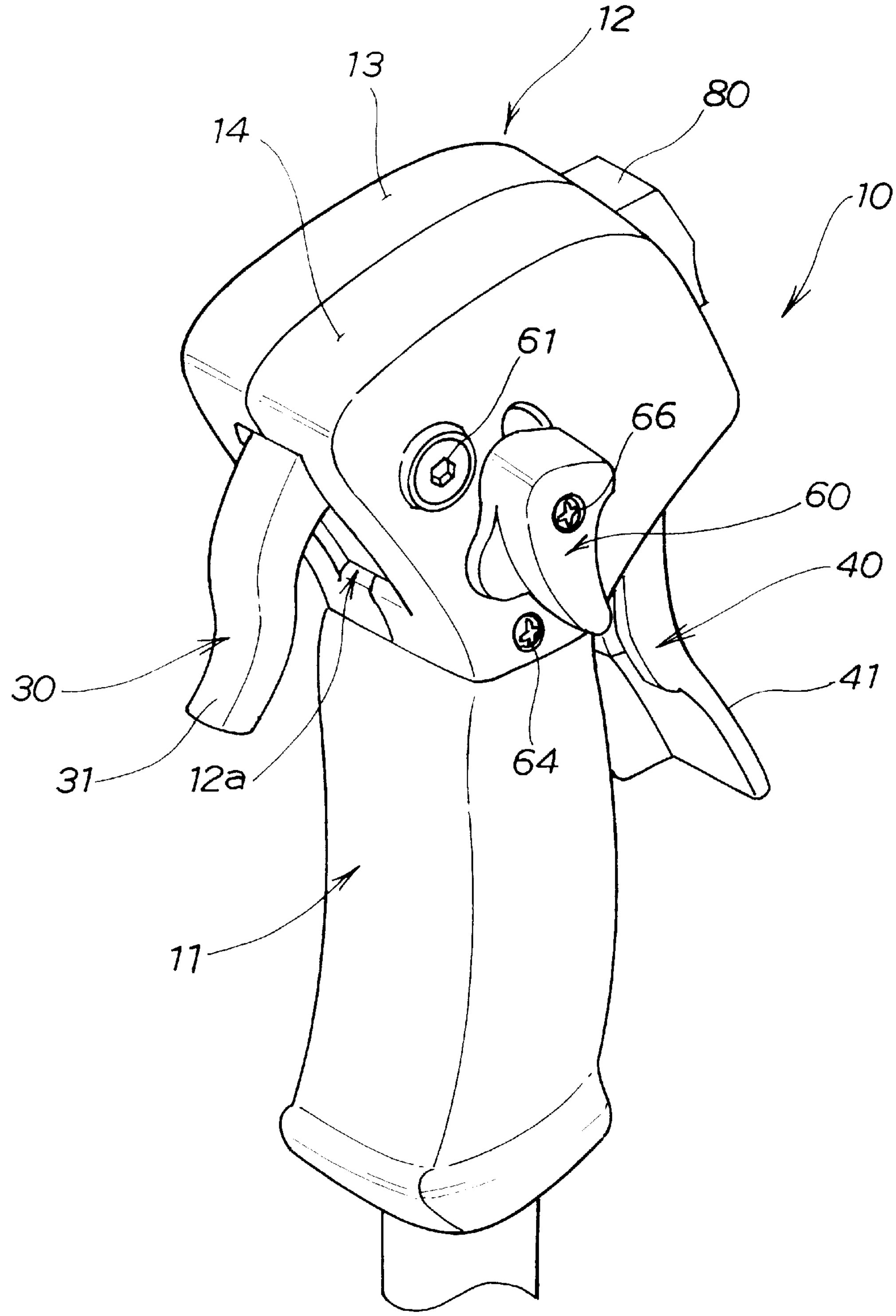
FIG. 2 is a perspective view of the operation-control lever unit including a grip handle.

As shown in FIG. 2, the operation-control handle 10 is in the form of the grip of a gun and includes a tubular grip portion 11 secured at a lower end to the support rod 5 via a bracket (not shown), and an enlarged head portion 12 secured to an upper end of the grip portion 11.

The head portion 12 is a hollow member of split structure consisting of left and right head halves or members 13, 14 joined together back to back to form a hollow interior space or pocket in the head portion 12. The head portion 12 has an elongate hole or opening 12*a* formed in a front wall thereof. A throttle lever 30 and a lock lever 40 of the operation-control lever unit are pivotally mounted to the head portion 12 within the pocket. The throttle lever 30 has a trigger-like lever portion 31 projecting forwardly and downwardly from the elongate opening 12*a* in the front wall of the head portion 12. Similarly, the lock lever 40 has an actuating lever portion 41 projecting rearwardly and downwardly from an elongate hole or opening 12*c* (FIG. 5) formed in a rear wall of the head portion 12.

Figure 5:
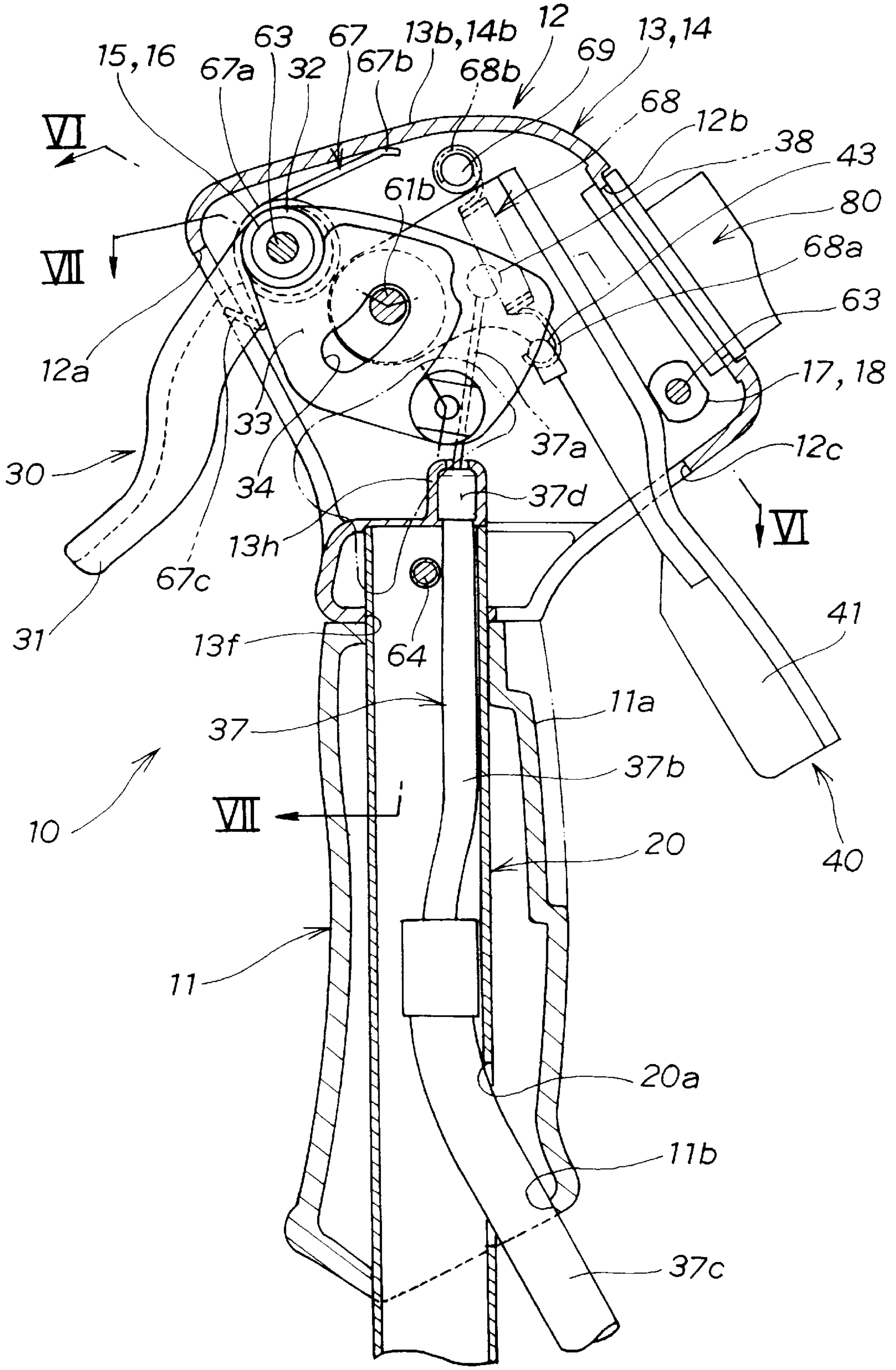
FIG. 5 is a longitudinal cross-sectional view of the grip handle, showing the internal structure of the operation-control lever unit.

An engine start switch 80 for starting and stopping the engine 3 (FIG. 1) is provided on the rear wall of the head portion 12 at a position above the opening 12*c* (FIG. 5). Additionally, a secondary throttle adjustment lever 60 is provided on one side (left side in the illustrated embodiment) of the head portion 12 for achieving fine adjustment of the position of the throttle lever 30.

Figure 3:
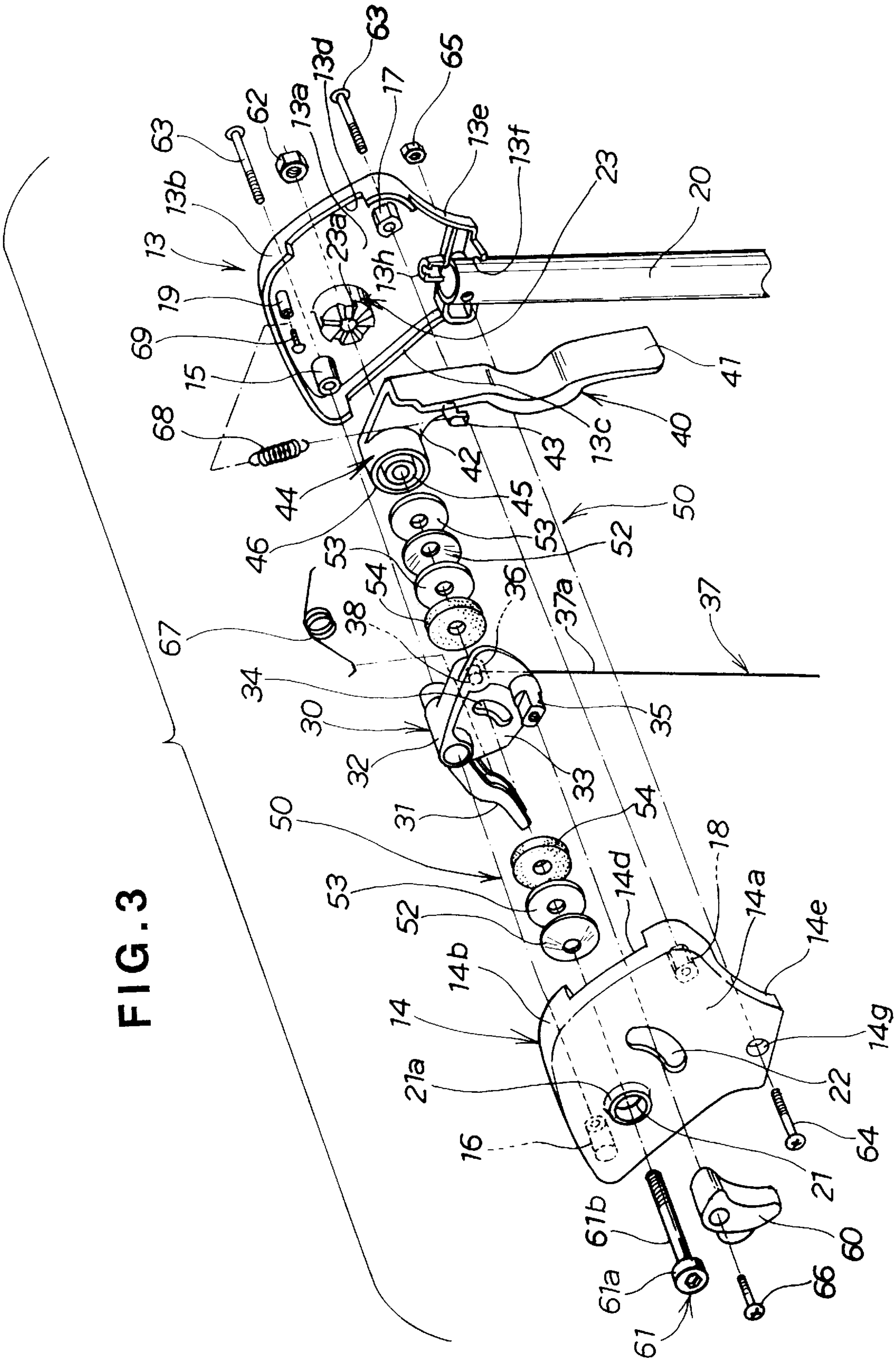
FIG. 3 is an exploded perspective view of a main portion of the operation-control lever unit.

FIG. 3 shows in perspective the general arrangement of the operation-control lever unit of the present invention.

As shown in FIG. 31 the head members 13, 14 have a generally pentagonal dish-like form and each include a planar base 13*a*, 14*a* and a peripheral wall 13*b*, 14*b* integral with a peripheral edge of the base 13*a*, 14*a* and extending perpendicularly to the base 13*a*, 14*a*. The peripheral wall 13*b* has four cutout portions 13*c*, 13*d*, 13*e* and 13*f* formed in consecutive four sides of the pentagonal head member 13. Similarly, the peripheral wall 14*b* has four cutout portions 14*d*, 14*e* (two cutout portions corresponding in position to the cutout portions 13*c*, 13*f* being not shown) formed in consecutive four sides of the pentagonal head member 14. When the two head members 13, 14 are assembled together to form the control head 12, the cutout portion 13*c* of the peripheral wall 13*b* and the corresponding unillustrated cutout portion of the peripheral wall 14*b* jointly form the above-mentioned elongate opening 12*a* (FIGS. 1 and 5). Similarly, the cutout portions 13*d*, 14*d* jointly form an elongated hole or opening 12*b* (FIG. 5) from which the engine start switch 60 projects outwardly. The cutout portions 13*e*, 14*e* jointly form the above-mentioned elongated opening 12*c* (FIG. 5) which allows pivotal movement of the lock lever 40.

The head member 13 has an integral cylindrical sleeve 15 projecting perpendicularly from an inside surface of the planar base 13*a*. The sleeve 15 is located near a front end of the head portion 12. The head member 14 also has an integral cylindrical sleeve 16 projecting perpendicularly from an inside surface of the planar base 14*a*. The sleeve 16 is aligned with the sleeve 15. The sleeve 15 of the head member 13 has a through-hole, while the sleeve 16 of the head member 14 has an internally threaded blind hole closed at one end by the base 14*a*. The head members 13, 14 further have a pair of aligned cylindrical sleeves 17, 18 projecting perpendicularly from respective inside surfaces of the planar bases 13*a*, 14*a* at a position located near a rear end of the head members 13, 14. The sleeve 17 has a through-hole, while the sleeve 18 has an internally threaded blind hole closed by the base 14*a*. The sleeve 18 is longer than the sleeve 17. Respective outer peripheral surfaces of the sleeves 17, 18 are cut or removed at diametrically opposite portions thereof so as to define a pair of parallel diametrically opposite flat surfaces extending obliquely to an axis of the grip portion 11 (FIG. 2). When the two head members 13, 14 are assembled together, the sleeves 15, 17 on the base 13*a* are in abutment with the sleeves 16, 18 on the base 14*a*, respectively.

An internally threaded hollow cylindrical spring retaining lug 19 projects perpendicularly from the inside surface of the base 13*a* of the head member 13. The spring retaining lug 19 is located near an upper end of the head member 13. The cutout portions 13*f*, 14*f* (14*f* being shown in FIG. 7) formed in the respective peripheral walls 13*b*, 14*b* at a lower end of the head portion 12 have a semicircular shape and jointly form a circular hole in which an upper end portion of a metal pipe 20 is fitted. The pipe 20 is assembled with the head members 13, 14 by means of a screw 64. The screw extends successively through a hole 14*g* in the head member 14, a radial through-hole (not designated) in the pipe 20, and a hole 13*g* (FIG. 7) in the head member 13 and is threaded into a nut 65 so that the head members 13, 14 and the pipe 20 are tightly fastened together. The handle portion 11 is fitted around the pipe 20.

The head member 14 has a through-hole 21 formed in an intermediate portion of the base 14*a* which is offset from the center of the base 14*a* toward the front end of the base 14*a*. The intermediate portion of the base 14*a* has an annular flange 21*a* projecting from an outside surface of the base 14*a* so that a longitudinal part of the through-hole 21 is defined by the annular flange 21*a*. The through-hole 21 is clearance-fit with an enlarged head 61*a* of a support shaft 61. The base 14*a* further has an arcuate oblong hole 22 extending arcuately about a central axis of the sleeve 16. The arcuate oblong hole 22 is disposed rearwardly of the through-hole 21 when viewed from the sleeve 16.

The head member 13 further has a first cam 23 formed on the inside surface of the base 13*a* in coaxial relation with the through-hole 21. The first cam 23 is a cylindrical cam having an axial central through-hole 23*a* aligned with the through-hole 21 in the head member 14. The cylindrical cam 23 has an end face formed with a cam surface 24 (FIG. 4) facing the base 14*a* of the head member 14. The cam surface 24 is profiled in a manner as described below with respect to FIG. 4.

The throttle lever 30, the lock lever 40 and a throttle-lever holding mechanism 50 are disposed between the head members 13, 14. The first and second cams 23, 47 form a part of the throttle-lever holding mechanism 50.

The throttle lever 30 includes a hollow cylindrical head 32 formed integrally with an upper end of the lever portion 31, and a sector member 33 projecting radially outwardly from the cylindrical head 32. The sector member 31 has an arcuate guide grooves 34 extending arcuately about an axis of the cylindrical head 32. The throttle lever 30 further has a support lug 35 projecting from an outer peripheral edge portion of one surface of the sector member 33 toward the head member 14. The support lug 35 is cutout or removed at diametrically opposite portions thereof so as to define a pair of diametrically opposite flat surfaces 35*a* (FIG. 7) for a purpose described later. Thus, the support lug 35 has a non-circular cross section.

Figure 6:
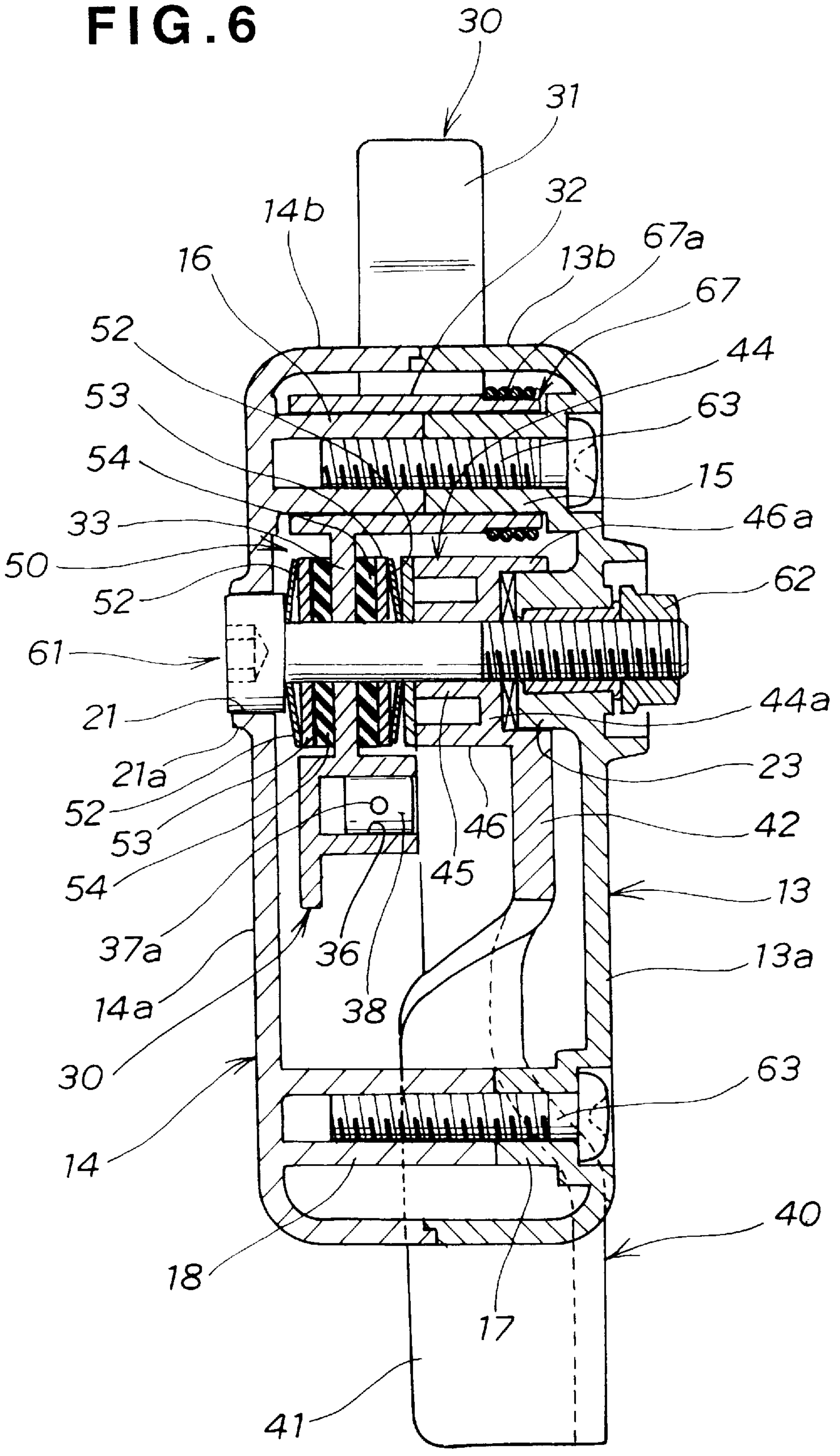
FIG. 6 is a cross-sectional view taken along line VI—VI of FIG. 5.

The throttle lever 30 further includes a tubular socket 36 projecting perpendicularly from the other surface of the sector member 33. The socket 36 totatably receives therein an anchor pin 38 connected to one end of a control cable 37, as shown in FIG. 6. The other end of the control cable 37 is connected to the control shaft of a throttle valve (not shown) of the engine 3 (FIG. 1).

The lock lever 40 has a substantially rectangular flat base portion 42 integral with an upper end of the lever portion 41 and bent at right angles to the lever portion 41, and a hook-shaped spring retainer 43 provided at a lower end of the base portion 42 adjacent the lever portion 41.

The lock lever 40 further has a cylindrical head 44 of double tube structure including a pair of concentric inner and outer tubes 45 and 46 joined at one end. The outer tube 46 has an integral hollow cylindrical extension 46*a* projecting from the joined end toward the base 14*a* of the head member 14. The double tube head 44 is formed integrally with a distal end of the base portion 42 at the extension 46*a* of the outer tube 46. The inner and outer tubes 45, 46 are connected together by an annular end wall 44*a* (FIG. 6) which forms the bottom of the cylindrical extension 46*a*. The lock lever 40 has a second cam 47 formed at the bottom of the cylindrical extension for coaction with the cam 23 formed on the head member 13. The cam 47 has a cam surface 47 profiled in a manner described below with reference to FIG. 4.

In an assembled condition where the throttle lever 30 and the lock lever 40 are pivotally mounted on the head portion 12, a conical spring washer 52, a metal washer 53, and a rubber ring disc 54 are disposed between the double tube head 44 of the lock lever 40 and the sector member 33 of the throttle lever 30 in the order named when viewed from the double tube head 44. Similarly, a rubber ring disc 54, a metal washer 53 and a conical spring washer 52 are disposed between the sector member 33 of the throttle lever 30 and the base 14*a* of the head member 14 in the order named when viewed from the sector member 33. The conical spring washers 53 form a resilient means of the throttle lever holding mechanism 50 which is disposed behind the second cam 47 (FIG. 4) when viewed from the first cam 23 and operates to urge the second cam 47 toward the first cam 23. The rubber ring discs 54 form a friction member of the throttle lever holding mechanism 50 which is disposed between the throttle lever 30 and the lock lever 40 and is adapted to be forced against the throttle lever 30 when coaction between the first and second cams 23, 47 causes the lock lever 40 to be displaced toward the throttle lever 30 against the resiliency of the resilient means (biasing members of conical spring washers) 52.

Figure 7:
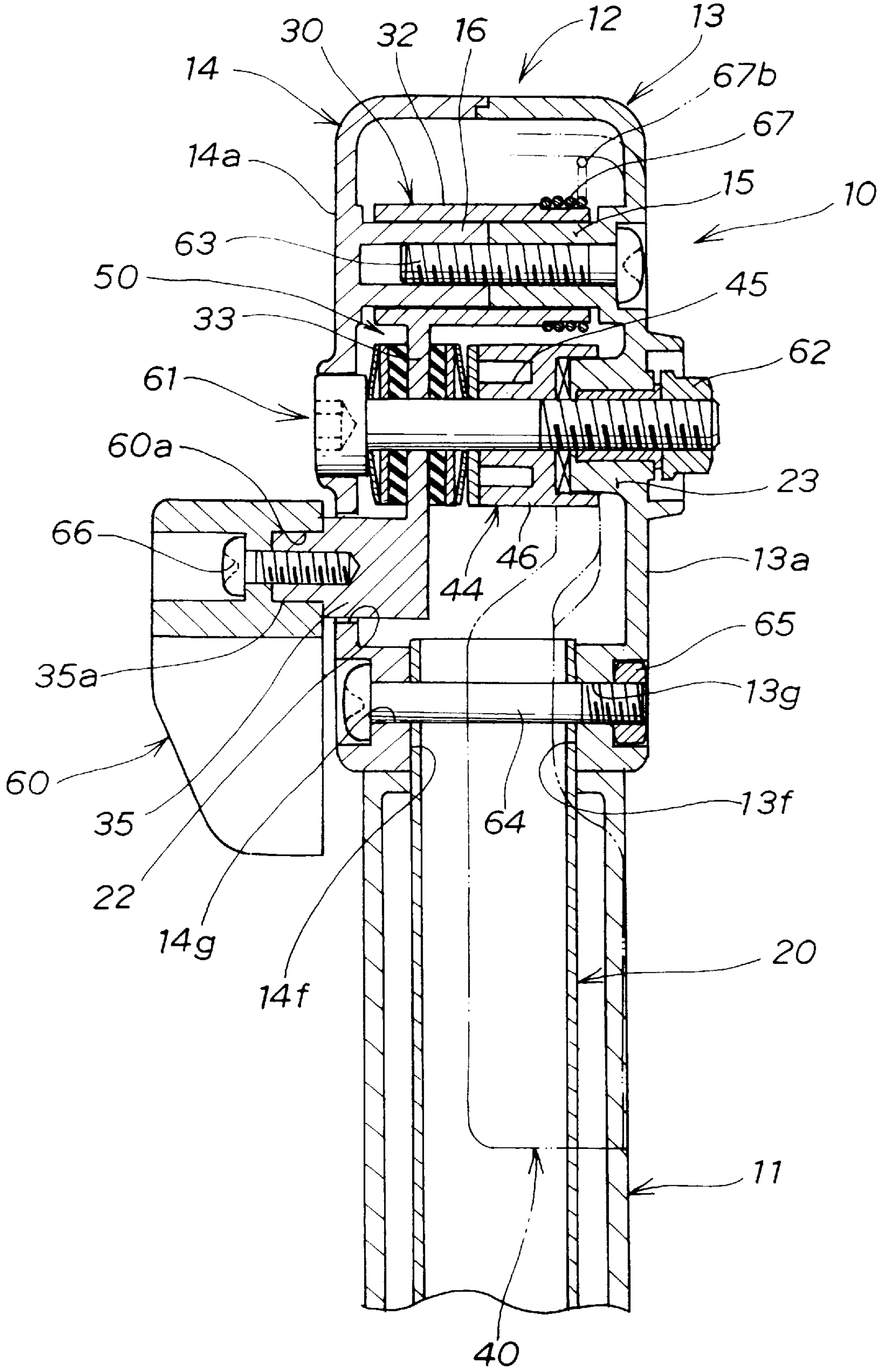
FIG. 7 is a cross-sectional view taken along line VII—VII of FIG. 5.
Figure 8:
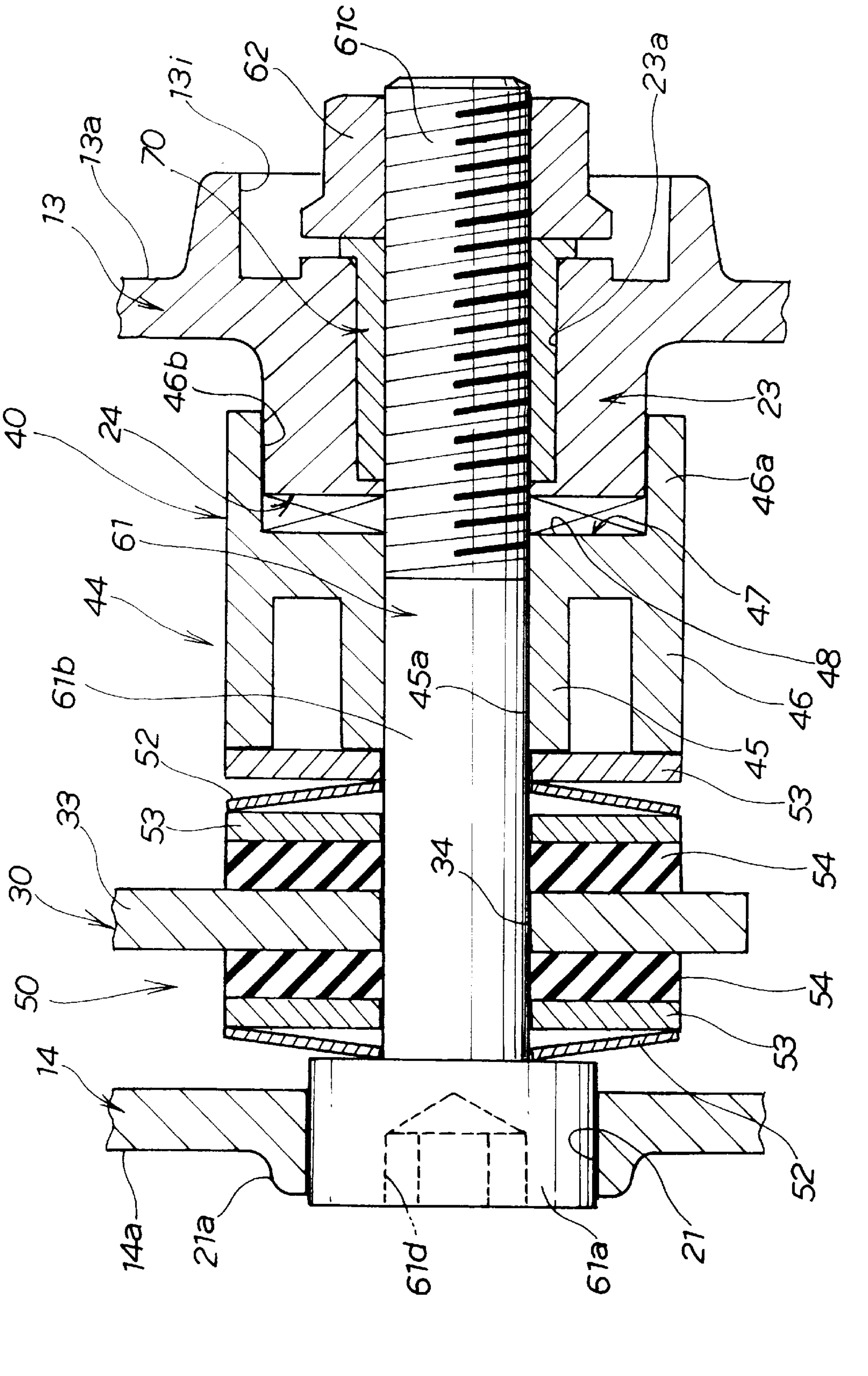
FIG. 8 is an enlarged view of a part of FIG. 6, showing a throttle-lever holding mechanism of the operation-control lever unit.

In FIG. 3, numeral 60 denotes a fine adjustment lever 60 attached by a screw 66 to the support lug 35 of the throttle lever 30 for achieving fine adjustment of the throttle position. The headed support shaft 61 has a long shank 61*b* extending through the conical spring washer 52, metal washer 53, rubber ring disc 54, arcuate guide hole 34 of the sector section 33, rubber ring disc 54, metal washer 53, conical spring washer 52, metal washer 53, double tube head 44 of the lock lever 40 and through-hole 23*a* of the cylindrical cam 23. A nut 62 is threaded with an externally threaded fore end portion 61*c* (FIG. 8) of the shank 61*b* of the support shaft 61, as shown in FIGS. 6–8. Two screws 63, 63 are inserted into the through-holes of the sleeves 15 and 17 and threaded into the internally threaded blind holes of the sleeves 16 and 17 to couple the head members 13 and 14 to form the head portion 12. In an assembled condition, the peripheral walls 13*b*, 14*b* of the head members 13, 14 are interlocked with each other, as shown in FIG. 6.

In FIG. 3, reference numeral 67 denotes a return spring acting between the throttle lever 30 and the head portion 12 to urge the throttle lever 30 toward an original unlock position. A tension coil spring 68 has one end connected to the hook-shaped spring retainer 43 of the lock lever 40 and the other end connected by a screw 69 to the spring retaining lug 19 on the head member 13. The spring 68 urges the lock lever 40 in an original stand-by position in which the lever portion 41 is forced against the lower oblique flat surfaces of the sleeves 17, 18, as shown in FIG. 5.

Figure 4:
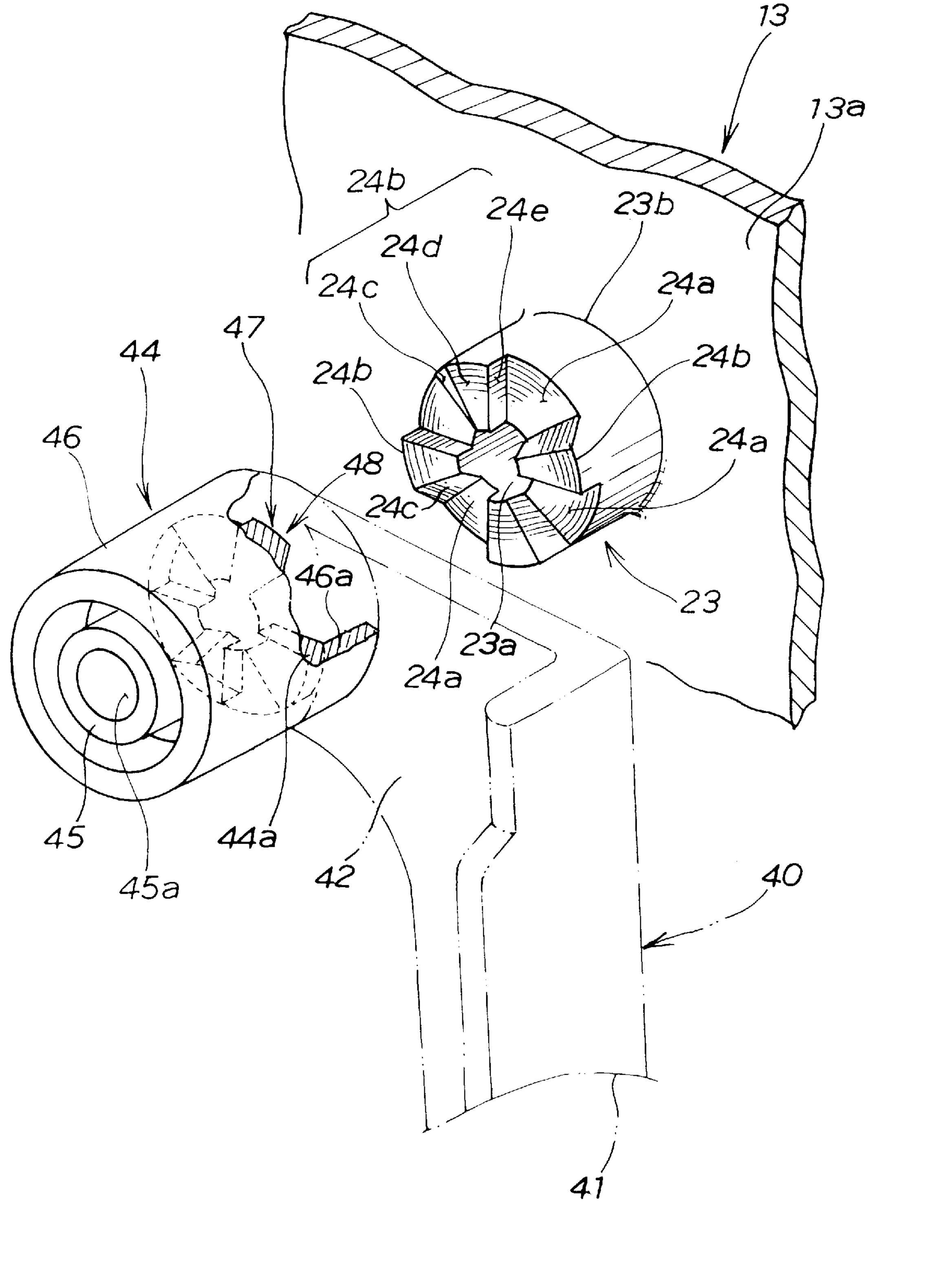
FIG. 4 is an enlarged view, with parts cutaway for clarity, showing a portion of FIG. 2 including a first cam and a second cam.

As shown in FIG. 4, the cylindrical first cam 23 formed integrally with the inner surface of the base 13*a* of the head member 13 is a fixed cam, while the second cam 47 formed at the bottom of the cylindrical extension 46*a* of the double tube head 44 of the lock lever 40 is a movable cam.

Due to the axial central through-hole 23*a* of the fixed cylindrical first cam 23, the cam surface 24 formed on an end face of the cylindrical first cam 23 has an annular shape. The cam surface 24 has alternate ridges **24*b* and grooves 24*a* arranged in the circumferential direction of the cylindrical first cam 23. The grooves 24*a* and ridges 24*b* extend radially across the thickness of the cylindrical first cam 23. The ridges 24*b* each have opposite sidewalls or flanks 24*c* and 24*e* and a top 24*d*. The top 24*d* is flat and extends perpendicularly to an axis of the cylindrical first cam 23. One flank 24*c*, which faces in the counterclockwise direction shown in FIG. 4, is beveled or sloped. The other flank 24*e*, which faces toward the clockwise direction shown in FIG. 5, is perpendicular to the flat top 24*d* and is parallel to the axis of the cylindrical first cam 23. In FIG. 4, the clockwise direction is the same as the direction of pivotal movement of the lock lever 40** toward a locking position. This direction is hereinafter referred to as "locking direction".

The cylindrical extension **46*a* of the double tube head 44 has an inside diameter determined to achieve a slid-fit connection between the double tube head 44 and the cylindrical first cam 23. This means that an inner peripheral surface 46*b* (FIG. 8) of the cylindrical extension 46*a* is in slide contact with an outer peripheral surface 23*b* of the cylindrical first cam 23**.

Figure 11:
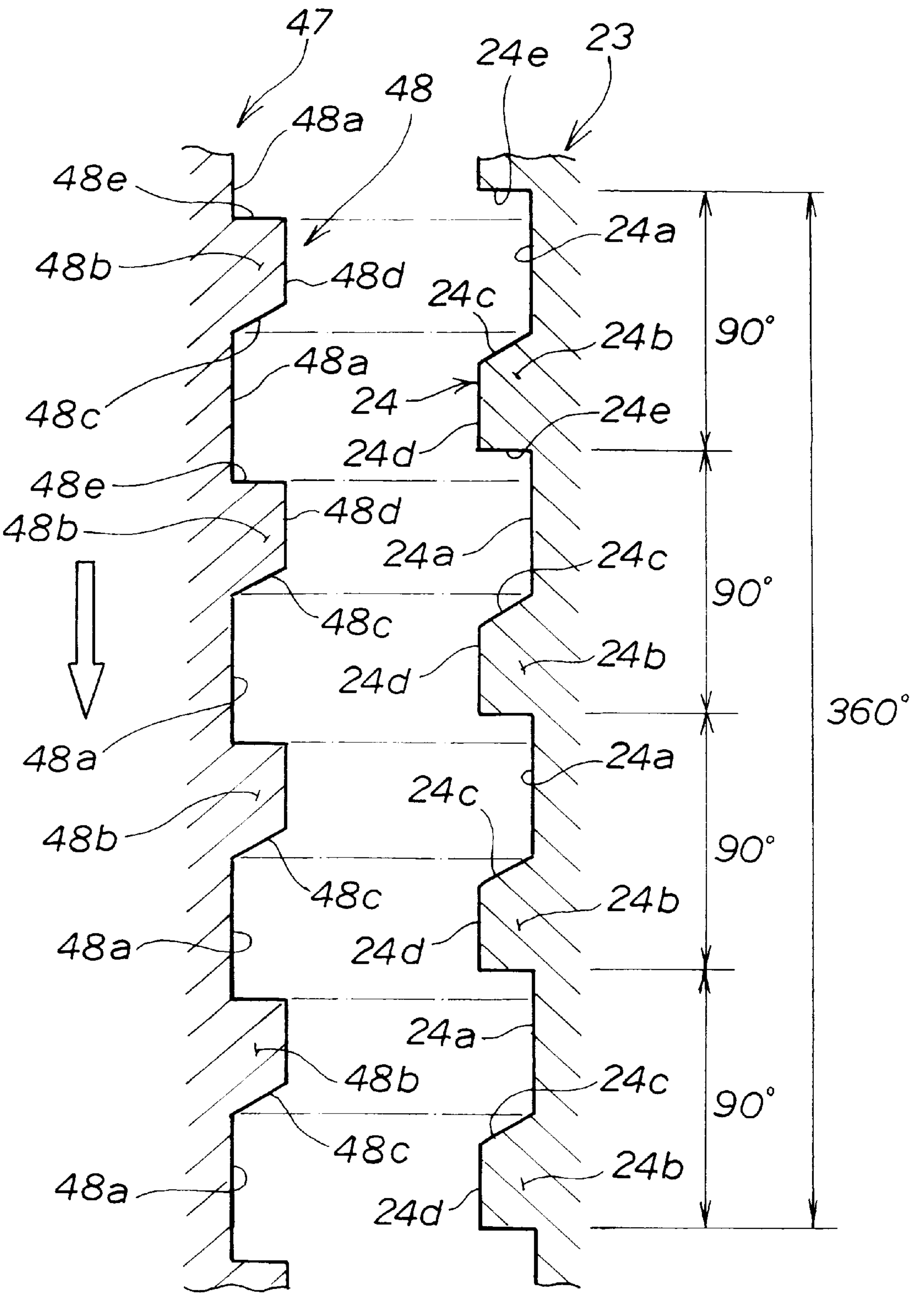
FIG. 11 is a developed view showing respective profiles of the first and second cams.

The cam surface 48 of the movable second cam 47, which is formed on the annular end wall **44*a* at the bottom of the cylindrical bore 46*a*, has the same cam profile as the cam surface 24 of the first cam 23. More specifically, as shown in FIG. 11, the cam surface 48 has alternate ridges 48*b* and grooves 48*a* arranged in the circumferential direction of the annular end wall 44*a*, so that the ridges 48*b* of the second cam 47 can interdigitate with the ridges 24*b* of the first cam 23. Beveled or sloped flanks 48*c* of the ridges 48*b* face toward the locking direction (indicated by the profiled arrow in FIG. 11) which is opposite to the direction of facing of the sloped flanks 24*c* of the first cam 23**.

When the lock lever 30 is manually turned in the locking direction (clockwise direction in FIG. 5) about the axis of the double tube head 44, the cam surface 48 of the second cam 47 coacts with the cam surface 24 of the first cam 23 to displace the second cam 47 and the lock lever 30 along the support shaft 61 (FIG. 3) in a direction away from the head member 13 against the resilient force of the conical spring washers 52 (FIG. 4).

Figure 9:
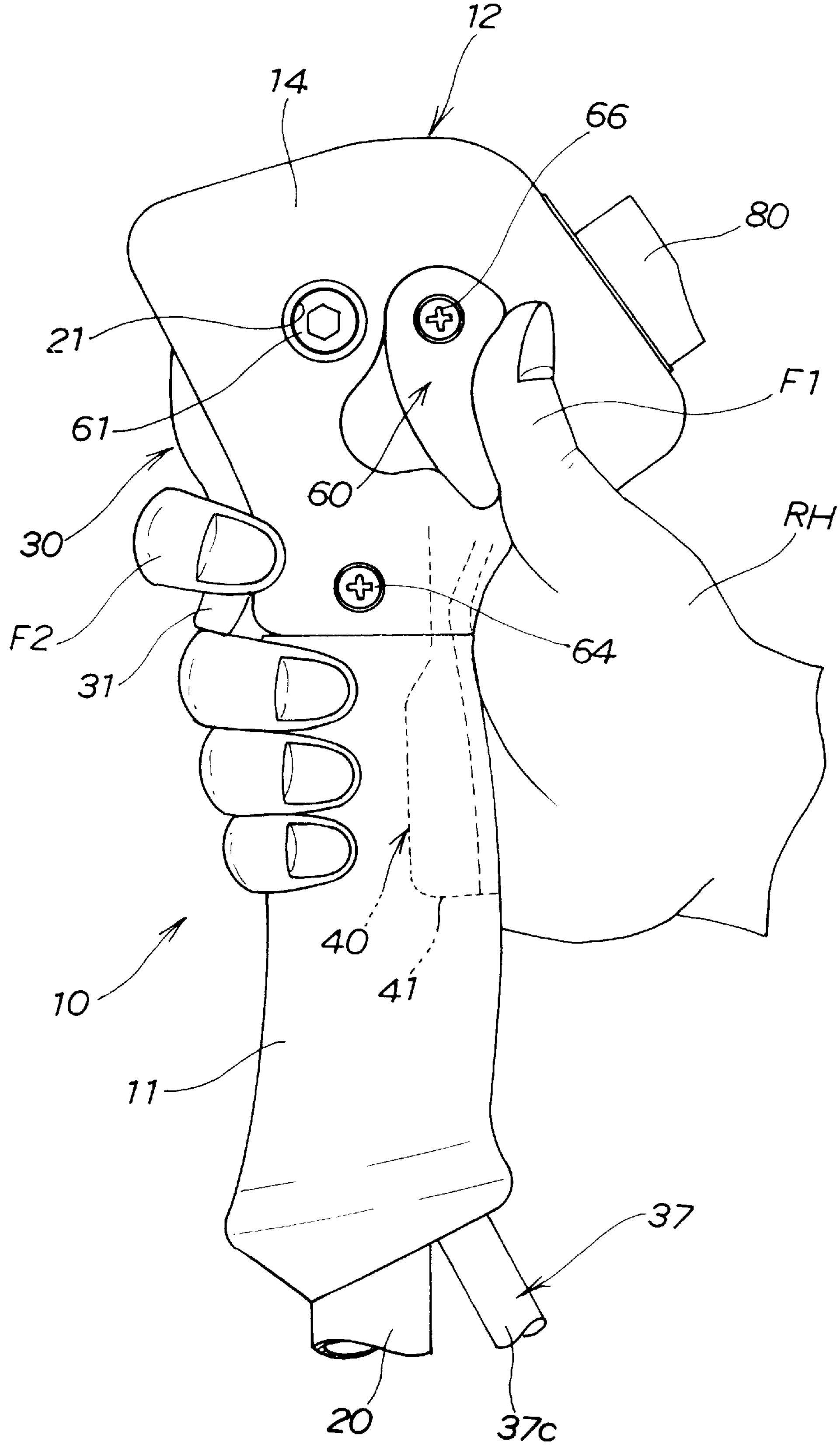
FIG. 9 is a side view of the grip handle showing a lock lever of the operation-control lever unit in its throttle-lock position.

As shown in FIG. 5, the grip portion 11 has an elongated recess **11*a* formed in a rear surface of the grip portion 11 along an upper member of the grip portion 11. The recess 11*a* accommodates within it the lever portion 41 of the lock lever 40 when the lock lever 40 is fully depressed, as shown in FIG. 9**.

The control cable 37 includes a control wire **37*a* connected at one end to the anchor pin 38 and, at the other end, to the control shaft of the throttle valve (not shown) of the engine 3 (FIG. 1). The control cable 37 further has an upper sheath or jacket 37*b* covering an upper portion of the control wire 37*a*, and a lower sheath or jacket 37*c* connected to a lower end of the upper jacket 37*b* and covering the remainder of the control wire 37*a*. The lower jacket 37*c* has a larger diameter than the upper jacket 37*b*. The upper jacket 37*b* has at its upper end a guide sleeve 37*d* of metal. The metal guide sleeve 37*d* is held within a retainer pocket 13*h* formed integrally with the base 13*a* of the head member 13 at a portion above the cutout portion 13*f***.

The pipe 20 has a radial hole or opening **20*a* located near a lower opening 11*b* of the grip portion 11, so that the control cable 37 can be drawn out from the operation-control lever 10 through the radial opening 20*a* of the pipe 20 and the lower opening 11*b* of the grip portion 11. A lower end portion of the pipe 20 is drawn out from the lower opening 11*b* of the grip portion 11 and is connected to the support rod 5**.

The cylindrical head 32 of the throttle lever 30 is slidably fitted around the sleeves 15, 16 for pivotal movement about a common axis of the sleeves 15, 16. The return spring 67 is a torsion coil spring having a coiled portion **67*a* wound around the cylindrical head 32. By the resiliency of the torsion coil spring 67, One end 67*b* of the spring 67 is urged against an upper part of the peripheral wall 13*b* of the head member 13. The other end 67*c* of the spring 67 is anchored to a base portion of the throttle lever 31. Thus, the throttle lever 30 is urged to turn clockwise in FIG. 5 about the axis of the sleeves 15,16 by the resiliency of the torsion coil spring 67, so that the throttle lever 30 is normally held in the stand-by position shown in FIG. 5**.

The support shaft 61 extending across the breath of the head portion 12 penetrates the arcuate guide hole 34 in the sector member 33 of the throttle lever 30.

The inner tube 45 (FIG. 6) of the double tube head 44 of the lock lever 40 is slidably fitted around the shank **61*b* of the support shaft 61 so that the lock lever 40 is pivotally movable about an axis of the support shaft 61. The lever portion 41 of the lock lever 40 project obliquely and downwardly from the elongated opening 12*c* of the head portion 12. The tension coil spring 68 acting between the hook-shaped spring retainer 43 of the lock lever 40 and the spring retaining lug 19 on the head member 13 urges the lock lever 40 to turn counterclockwise in FIG. 5 about the axis of the support shaft 61. Thus, the lock lever 40 is normally held in the stand-by position of FIG. 5 in which the lever portion 41 is forced against the lower oblique flat surfaces of the sleeves 17, 18**.

As shown in FIG. 7, the support lug 35 on the sector member 33 of the throttle lever 30 is loosely received in the oblong hole 22 in the base **14*a* of the head member 14 with its cross-sectionally non-circular portion (including the flat surfaces 35*a*, 35*a*) projecting from an outside surface of the base 14*a* of the head member 14. The cross-sectionally non-circular portion including the flat surfaces 35 is received in a recess 60*a* of the fine adjustment lever 60 which is attached by the screw 66 to the support lug 35. Since the recess 60*a* has a non-circular cross section complementary in shape to the non-circular cross section of the support lug 35, the fine adjustment lever 60 is non-rotatable relative to the support lug 35. For the purpose of manipulation, the fine adjustment lever 60 is located on the left side of the head portion 12, as shown in FIGS. 2 and 9**.

As shown in FIG. 8, the support shaft 61 comprises a hexagon socket head cap screw having an enlarged cylindrical socket head **61*a*, a long shank 61*b* and a male screw 61*c* externally threaded on a fore end portion of the shank 61*b*. The socket head 61*a* is slidably received in the through-hole 21 of the base 14*a* of the head member 14 and has a hexagonal hole 61*d* for receiving therein the tip of a tool, such as a hexagonal bar wrench. When the support shaft 61 is to be rotated, the hexagonal bar having one end snugly received in the hexagonal hole 61*d* is turned. The head 61*a* may be shaped into a hexagonal form which is slidably receivable in the through-hole 21 and hence is rotatable relative to the head portion 12**.

As previously described, the shank **61*b* of the support shaft 61 extends through the arcuate guide hole 34 of the sector member 33 of the throttle lever 30, and an axial through-hole 45*a* of the double tube head 45 of the lock lever 40. The male screw 61***c* of the support shaft 61 is threaded through an insert nut 70 press-fitted in the axial central hole 23*a* of the fixed first cam 23. A fore end portion of the male screw 61*c* projects from the insert nut 70, and the nut 62 is threaded with the projecting fore end portion of the male screw 61*c* to lock the support shaft 61 in position against movement relative to the head portion 12. Thus, the nut 62 serves as a lock nut. The lock nut 62 is partly received in an annular recess 13*i* formed in the outside surface of the base 13*a* of the head member 13. The insert nut 70 may be replaced by a sleeve (not shown).

The cam surface 24 of the fixed cylindrical first cam 23 and the cam surface 48 of the movable second cam 47 are held in pressure contact with each other with the outer peripheral surface 23 of the fixed cylindrical first cam 23 being in sliding contact with the inner peripheral surface 46*b* of the cylindrical extension 46*a* of the double tube head 44 of the lock lever 40. Since the cylindrical first cam 23 is slidably received in the cylindrical extension 46*a*, any foreign matter including dirt and dust is no longer possible to get into the cylindrical extension 46*a*. Thus, the cam surfaces 24, 48 of the first and second cams 23, 47 are completely free from contamination with dirt and dust and can operate stably and reliably over a long period of use.

The conical spring washer 52, the washer 53 and the rubber ring disk 54 are disposed between the enlarged cylindrical head 61*a* of the support shaft 61 and one side surface of the sector member 33 of the throttle lever 30 in the order named when viewed from the head 61*a* toward the sector member 33.

Similarly, the rubber ring disk 54, the washer 53 and the conical spring washer 52 are disposed between the other side surface of the sector member 33 and one end face of the double tube head 44 of the lock lever 40 in the order named when viewed from the sector member 33 toward the double tube head 44.

The conical spring washers 52 are disposed behind the movable second cam 47 when viewed from the fixed first cam 23 and form a resilient means for resiliently urging the cam surface 48 of the second cam 47 into pressure contact with the cam surface 24 of the first cam 23. The conical spring washers 52 also serve as a bias means for resiliently urging the rubber ring disks 54 against the opposite side surfaces of the sector member 33 of the throttle lever 30 when the lock lever 40 is displaced along the axis of the support shaft 61 toward the throttle lever 30 by coaction of the first and second cams 23, 47. The rubber ring disks 54 form a friction means adapted to be forced by the biasing means 52 against the sector member 33 of the throttle lever 30 to frictionally hold the throttle lever 30 in a desired operating position. The first and second cams 23, 47, the resilient means 52 and the friction member 54 jointly form the afore-mentioned throttle-lever holding mechanism 50.

The resilient force exerted from the throttle-lever holding mechanism 50 onto the throttle lever 30 can be adjusted by turning the hexagonal socket head 61*a* of the support shaft 61 by use of a hexagonal bar wrench (not shown) while the lock nut 62 is kept loosened so that the support shaft 61 is displaced relative to the head member 13 in the axial direction of the support shaft 61. In the normal condition, the resilient force is adjusted such that the rubber ring disks 54 are in light pressure contact with the opposite side surfaces of the sector member 33 of the throttle lever 30.

Operation of the operation control lever unit 10 will be described below with reference to FIG. 9.

In use of the carrying bush cutter 1 (FIG. 1), the operation control lever unit 10 is gripped for manipulation by one hand (right hand RH, for example) of the operator M (FIG. 1). In this instance, an upper part of the grip portion 11 and a lower part of the head portion 12 are held in a palm of the right hand RH. The index finger R2 of the right hand RH is placed on the lever portion 31 of the throttle lever 30, the thumb F1 is placed on the back of the fine adjustment lever 60, and the remaining fingers are used to grasp the upper part of the grip portion 11. Then, the index finger F2 is pulled to depress the throttle lever portion 31 until it reaches a desired position. Then the lever portion 41 of the lock lever 40 is depressed into the recessed portion 11*a* (FIG. 5) by a portion of the palm (a ball of the thumb, for example). As the lever portion 31 is depressed, the throttle lever 30 turns counterclockwise in FIG. 9 about the axis of the screw 63 (FIG. 5). This achieves adjustment of the position of the throttle valve (not shown) to thereby regulate the engine speed.

Figure 10:
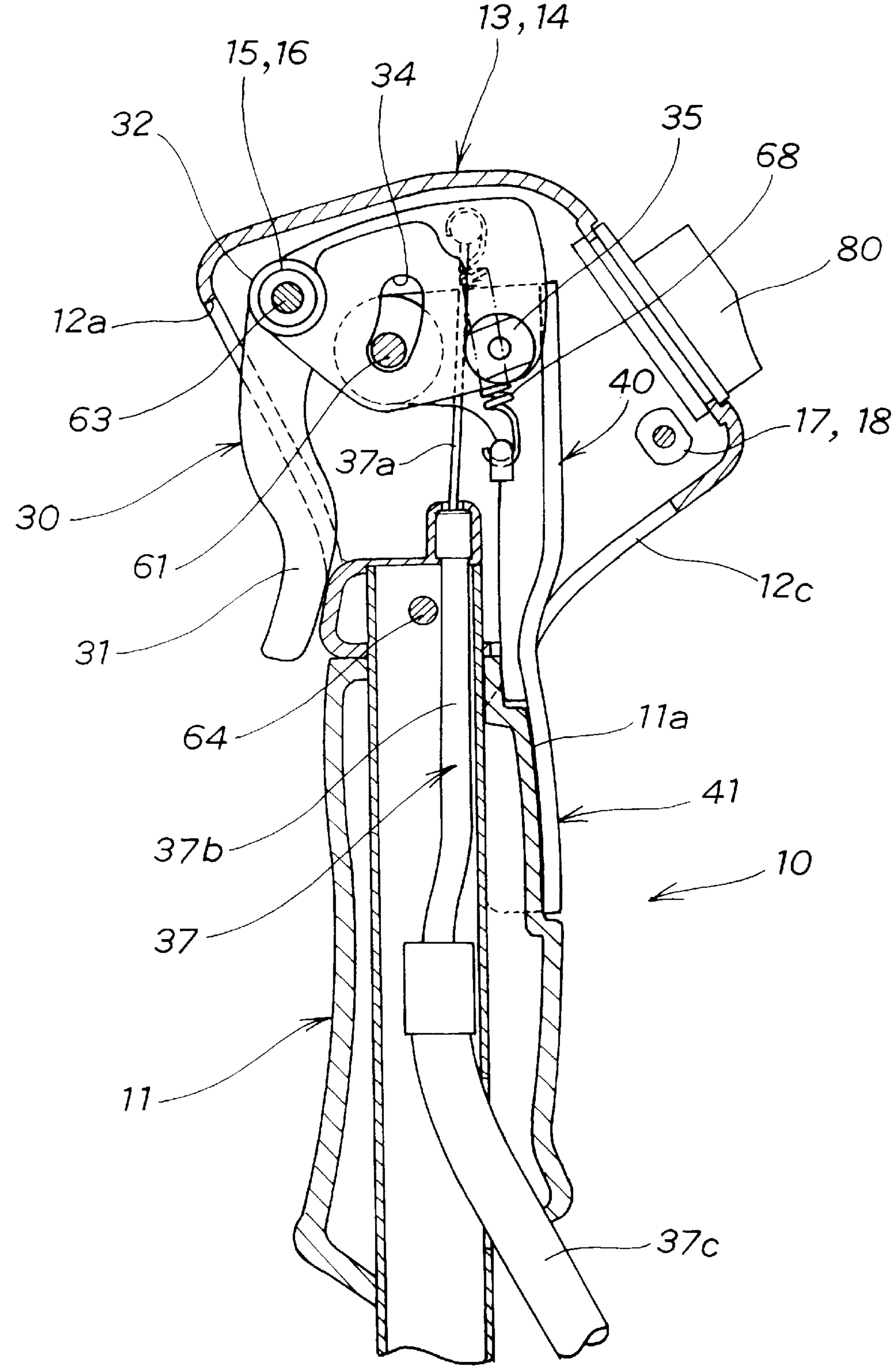
FIG. 10 is a longitudinal cross-sectional view of the grip handle showing the positional relationship between a throttle lever and the lock lever shown in FIG. 9.

Stated more specifically, as the throttle lever 30 turns counterclockwise in FIG. 10 about the screw 63 against the force of the return spring 67 (FIG. 5), the control wire 37*a* of the control cable 37 is pulled upwardly. With this upward movement of the control cable 37, the throttle valve incorporated in the carburetor of the engine 3 (FIG. 1) is turned in a direction to increase rotational speed of the engine 3. The throttle lever 30 shown in FIG. 10 is in the full-throttle position which defines an upper limits of an adjustable range of engine speed.

As the lever portion 41 of the lock lever 40 is depressed by the palm part such as the ball of the thumb F1, the lock lever 40 turns clockwise in FIG. 10 about the support shaft 61 against the force of the return spring 68. In this instance, the movable second cam 47 on the double tube head 44 turns about the support shaft 61 in the same direction as the lock lever 40. Accordingly, by a camming action between the respective cam surfaces 24, 48 of the first and second cams 23, 47, the rotary motion of the lock lever 40 is translated into a linear motion of the lock lever along the axis of the support shaft 61 in a direction toward the throttle lever 30.

The lateral movement of the double tube head 44 causes the conical spring washers 52, 53 (FIG. 8) to be compressed into a substantially fully distorted flattened position between the hexagonal socket head 21*a* of the support shaft 61 and the washer 52. With this distortion of the conical spring washers 52, 52, the rubber ring plates 54, 54 are strongly forced against the opposite surfaces of the sector member 33 of the throttler lever 30, so that the throttle lever 30 is held in a desired position against pivotal movement. One example of such desired position is the full-throttle position shown in FIG. 10.

The oblong guide hole 34 of the throttle lever 30 extends arcuately about the axis of the sleeves 15, 16, the throttle lever 30 can smoothly turn about the axis of the sleeves 15, 16 while the sector member 33 is guided by sliding engagement between the guide hole 34 and the shank 61 of the support shaft 61.

As described above with reference to FIG. 7, the fine adjustment lever 60 is firmly secured by the screw 66 to the distal end of the support lug 35 projecting from the sector member 33 of the throttle lever 30 through the oblong guide hole 22 to the outside of the head portion 12 of the operation-control lever unit 10.

In operation, a ball of the thumb F1 is placed on the back of the fine adjustment lever 60, as shown in FIG. 9, then forced forwardly by the thumb F1 while a certain pressure is continuously applied from the index finger F2 to the lever portion 31 of the throttle lever 30. The forced forward movement of the fine adjustment lever 60 cause the throttle lever 30 to turn clockwise in FIG. 10 about the axis of the sleeves 15, 16 against a frictional force acting between the opposite surfaces of the sector member 33 and the spring biased rubber ring plates 54, 54 (FIG. 8) of the throttle-lever holding mechanism 50. During pivotal movement of the throttle lever 30, the support lug 35 on the sector member 33 is guided by and along the arcuate oblong hole 22 formed in the base 14*a* (FIG. 7) of the head member 14. The sector member 33 slips on two opposed surfaces of the ruber ring plates 54, 54.

Thus, when the engine 3 (FIG. 1) while running at a maximum speed is to be slowed down, the fine adjustment lever 60 is forced by the thumb F1 in the forward direction to cause the throttle lever 30 to separate from the full-throttle position of FIG. 10 and returns toward its original idling position of FIG. 5. With this pivotal movement of the throttle lever 30, the throttle valve incorporated in the carburetor of the engine 3 is operated in a direction to lower the engine speed (corresponding to power of the engine 3). During that time, the lock lever 40 is continuously held in its fully depressed locking position shown in FIG. 10. 10.

The fine adjustment lever 60 is displaced in the forward direction of the head portion 12 by forcing or pushing it with the thumb F1. The thumb F1 when used to push the fine adjustment lever 60 can produce a greater power than when used to pull the same lever 60. Thus, manipulation of the fine adjustment lever 60 using the thumb F1 can be achieved with utmost ease and high reliability even though the throttle-lever holding mechanism 50 continuously operates to frictionally hold the throttle lever 30 in position against pivotal movement while the lock lever 40 is in its fully depressed position.

Then, explanation will be given of the cam mechanism which forms an essential part of the throttle-lever holding mechanism 50 (FIG. 8). As described above, the cam mechanism is formed by the stationary cam 23 and the movable cam 47. These cams 23, 47 have respective cam surfaces 24, 48 engaged with each other.

As shown in FIG. 11, the cam surface 24 of the stationary cam 23 have four grooves 24*a* and four ridges 24*b* provided alternately at equal angular intervals of 90 degrees. The ridges 24*b* have the same height. The top surfaces 24*b* of the ridges 24*b* and the bottom surfaces of the grooves 24*a* are flat, parallel with each other, and perpendicular to the axis of the annular stationary cam 23. The flat top surfaces 24*d* have a predetermined width (corresponding to an extent in the circumferential direction of the cam surface 28). One sidewall or flank 24*c* of each ridge 24*b* is sloped, and the other flank 24*e* is perpendicular to the top surface 24*d* and the bottom surface of the groove 24*a*. The ridges 24*b* have a maximum width (including the width of the associated sloped flanks 24*c*) which is smaller than the width of the grooves 24*a*.

Similarly, the cam surface 48 of the movable cam 47 have four grooves 48*a* and four ridges 48*b* provided alternately at equal angular intervals of 90 degrees. The ridges 48*b* have the same height. The top surfaces 48*b* of the ridges 48*b* and the bottom surfaces of the grooves 48*a* are flat, parallel with each other, and perpendicular to the axis of the annular movable cam 47. The flat top surfaces 48*d* have substantially the same width as the flat top surfaces 24*d* of the ridges 24*b*. One sidewall or flank 48*c* of each ridge 48*b* is sloped, and the other flank 48*e* is perpendicular to the top surface 48*d* and the bottom surface of the groove 48*a*. A maximum width of the ridges 8*b* (including the width of the associated sloped flanks 48*c*) is substantially the same as that of the ridges 24*b* and is smaller than the width of the grooves 48*a*. The sloped flanks 48*c* of the cam surface 48 and the sloped flanks 24*c* of the cam surface 24 face in opposite directions so that they are slidably engaged with each other when the movable cam 24 is turned, relative to the stationary cam 23, in a direction indicated by the profiled arrow shown in FIG. 11. In the normal condition where the lock lever 40 is in its standby position shown in FIG. 5, the ridges 48*b* of the cam surface 48 are in mesh with the ridges 24*b* of the cam surface 24.

A camming action of the cam mechanism which is induced by coaction between the cam surface 24, 48 of the stationary cam 23 and the cam surface 48 of the movable cam 47 will be described with reference to FIGS. 12A to 12C.

In the normal condition in which the lock lever 40 is in the standby position shown in FIG. 5, the cam surfaces 24, 48 are held in mutual interdigitating engagement under the bias of the conical spring washers 52,52, with the ridges 24*b* (48*b*) of one cam surface 24 (48) being received in the grooves 48*a* (24*a*) in the other cam surface 48 (24).

Figure 12A:
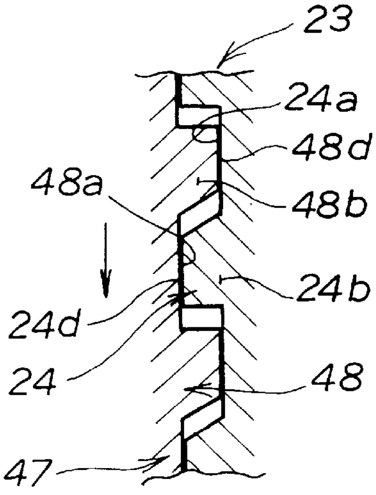
FIGS. 12A, 12B and 12C are views similar to FIG. 12, but showing operation of the first and second cam which occurs in response to pivotal movement of the lock lever.
Figure 12B:
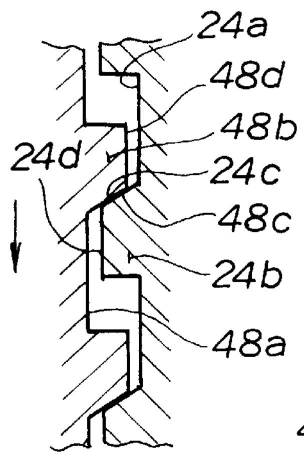

When the lock lever 40 is turned clockwise in FIG. 5 so as to control pivotal movement of the throttle lever 30, the movable cam 47 starts rotating in the direction of the arrow shown in FIG. 12A. Rotation of the movable cam 47 causes the sloped flanks 48*c* of the cam surface 48 of the movable cam 47 come into contact with the sloped flanks 24*c* of the cam surface 24 of the stationary cam 23, then slide up along the sloped flanks 24*c*. With this sliding movement of the sloped flanks 48*c*, the movable cam 47 is displaced in the left-hand direction in FIG. 12B against the forces of the conical spring washers 52 (FIG. 8).

As a consequence of the leftward movement of the movable cam 47, the cylindrical double tube head 44 (FIG. 8) of the lock lever 40 slides along the support shaft 61 in the leftward direction in FIG. 8 with the result that the rubber ring discs 54 are forced against the opposite surfaces of the sector member 33 of the throttle lever 30 by the forces of the conical spring washers 52. Thus, a frictional force acting between the ruber ring discs 54 and the sector member 33 increases.

Figure 12C:
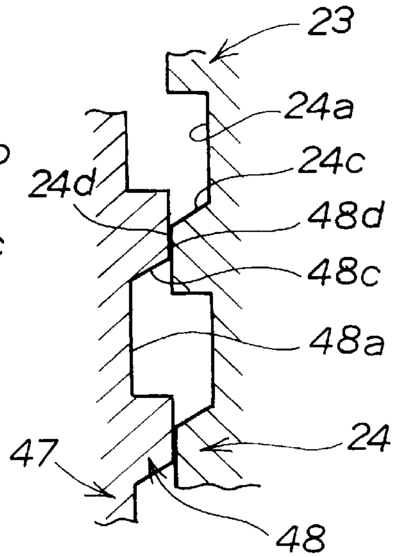

Continued rotation of the movable cam 48 causes the flat tops 48*d* of the respective ridges 48*b* of the movable cam 47 to come into sliding contact with the flat tops 24*d* of the ridges 24*b* of the stationary cam 23, as shown in FIG. 12C. In this instance, the movable cam 47 is displaced leftwards from its original position by a distance corresponding to the height of the ridges 24*b*, 48*b*. The position shown in FIG. 12C corresponds to a locking position of the throttle lever 30 by the action of the throttle-lever holding mechanism 50 in response to pivotal movement of the locking lever 40. In this locking position, the conical spring washers 52 are substantially fully deflected by the cylindrical double tube head 44 of the lock lever 40 so that the rubber ring discs 54, 54 firmly grip the sector member 33 with maximum friction to thereby lock the throttle lever 30 in position against pivotal movement.

Since the flat tops 24*d*, 48*d* of the ridges 24*b*, 48*b* of the cams 23, 47 have a certain length in the circumferential direction so that the locking condition of the throttle lever 30 is be kept even when the lock lever 40 is further turned to some extent.

Figure 13:
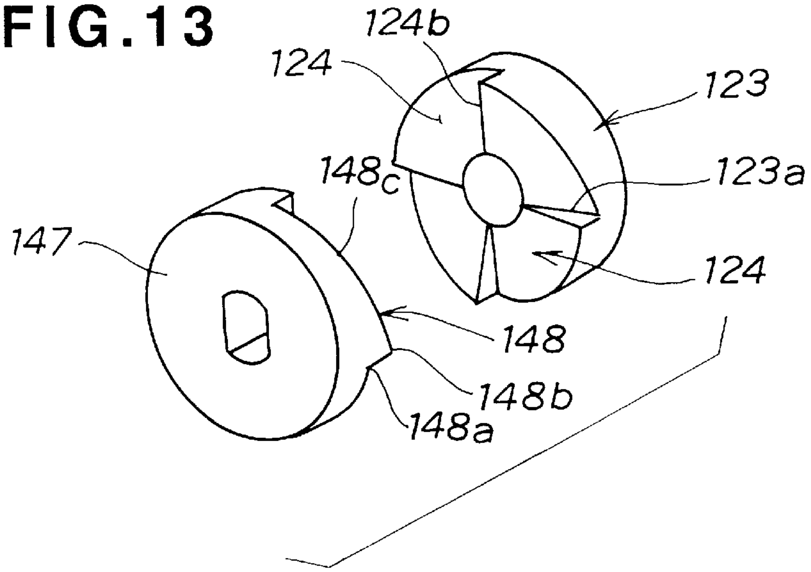
FIG. 13 is a perspective view showing another cooperating pair of cams prepared for comparative purposes.

FIG. 13 shows in comparative purposes a cam mechanism composed of two circular disc cams 123 and 147 each having on its one end face a cm surface 124, 148 including four ridges 124*b*, 148*b* formed contiguously in the circumferential direction. The ridges 124*b*, 148*b* have a triangular cross section and are separated by perpendicular walls 124*a*, 148*a*. The disc cam 123 is regarded as a stationary cam corresponding to the cam 23 (FIG. 3) formed integrally with the head member 13, and the disc cam 147 is regarded as a movable cam corresponding to the cam 48 (FIG. 3) integral with the lock lever 40.

The cam mechanism shown in FIG. 13 operates as follows.

Figure 14A:
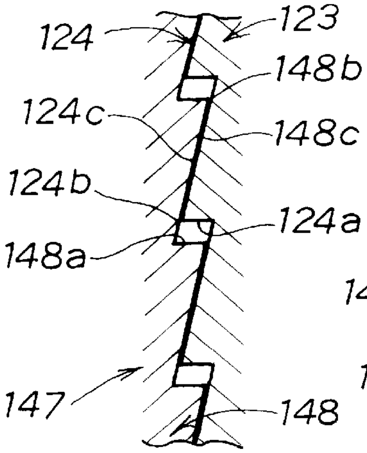
FIGS. 14A, 14B and 14C are views corresponding to FIGS. 12A, 12B and 12C, respectively, but showing operation of the cams shown in FIG. 13.

In the normal condition in which the lock lever 40 is in the standby position shown in FIG. 5, the ridges 124*b*, 148*b* of the cam surfaces 124, 148 of the cams 123, 147 are held in mutual interdigitating engagement under the bias of the conical spring washers 52,52, as shown in FIG. 14A.

Figure 14B:
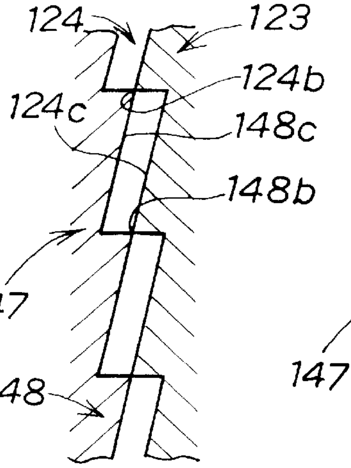
Figure 14C:
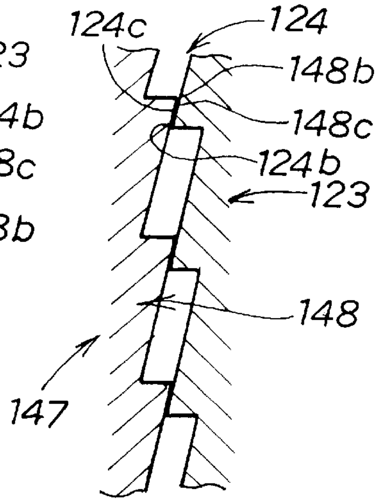

When the lock lever 40 is turned clockwise in FIG. 5, the cam 147 turned in the same direction, causing the ridges 148*b* of the movable cam 147 slide up along the ridges 124*b* of the stationary cam 123. When respective tip ends of the ridges 148*b* arrive at the corresponding tip ends of the ridges 124*b*, as shown in FIG. 14B, the movable cam 17 and the lock lever 40 are displaced leftwards to a maximum extent away from the stationary cam 123. In this condition, a throttle-holding mechanism including the cam mechanism 123, 147 exerts a maximum frictional force to the sector member 33, thereby locking the throttle lever 30 in position against pivotal movement. The tip-to-tip engagement between the ridges 124*b*, 148*b* of the cams 123, 147 is unstable, ans so when the force exerted on the lock lever 40 changes due to a change in working condition, a change in working posture, vibrations of the engine, or external shock forces, the movable cam 148 tends to turn in the opposite direction under the bias of the conical spring washers 52, causing the ridges 148*b* to slide down along the ridges 124*b* of the stationary cam 123, as shown in FIG. 12C. This means that the frictional force acting on the sector member 33 of the throttle lever 30 under the forces of the conical spring washers 52 decreases, allowing the throttle lever 30 to pivot in the direction to return to its original standby position. With this returning movement of the throttle lever 30, engine speed is slowed down, making the operation of the circular cutter 6 (FIG. 1) unstable. Such unintentional slowing down of the engine speed does not occur in the device of the present invention because of the trapezoidal cross-sectional shape of the ridges 24*b*, 48*b* of the cams 23, 47.

One of the cams 23, 47 may have ridges of a triangular cross-section similar to those 124*b*, 148*b* of the cams 123, 147. The number of the ridges 24*b*, 48*b* should by no means be limited to four in the illustrated embodiment and may be two, three, five or more ridges may be employed. Additionally, the stationary cam 23 formed integrally with the head member 13 of the operation-control handle 10 may be replaced with a separate cam 23 firmly secured to the head member 13.

Figure 15A:
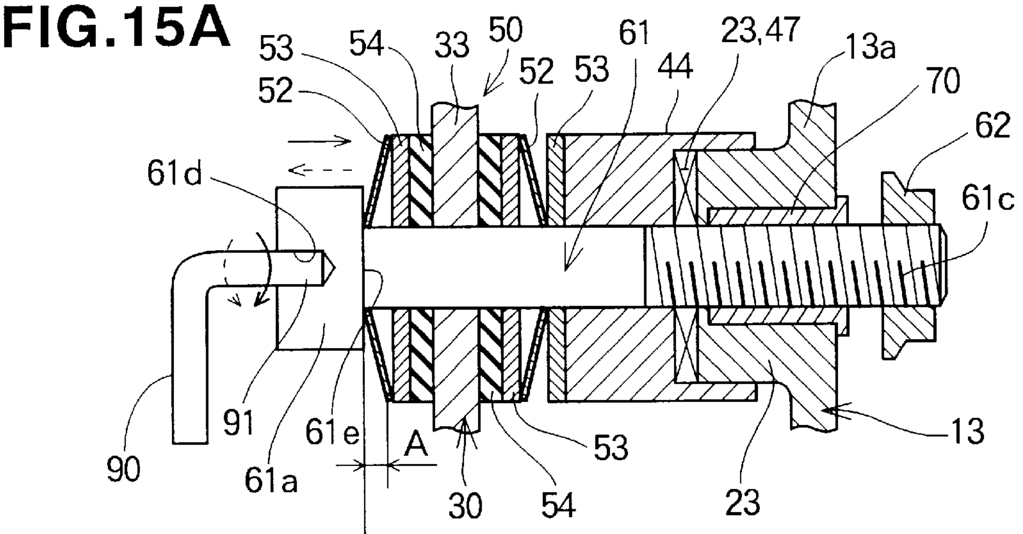
FIGS. 15A, 15B and 15C are cross-sectional views illustrative of the manner in which a frictional force acting between the throttle lever and a friction member of the throttle-holding mechanisms can be adjusted.
Figure 15B:
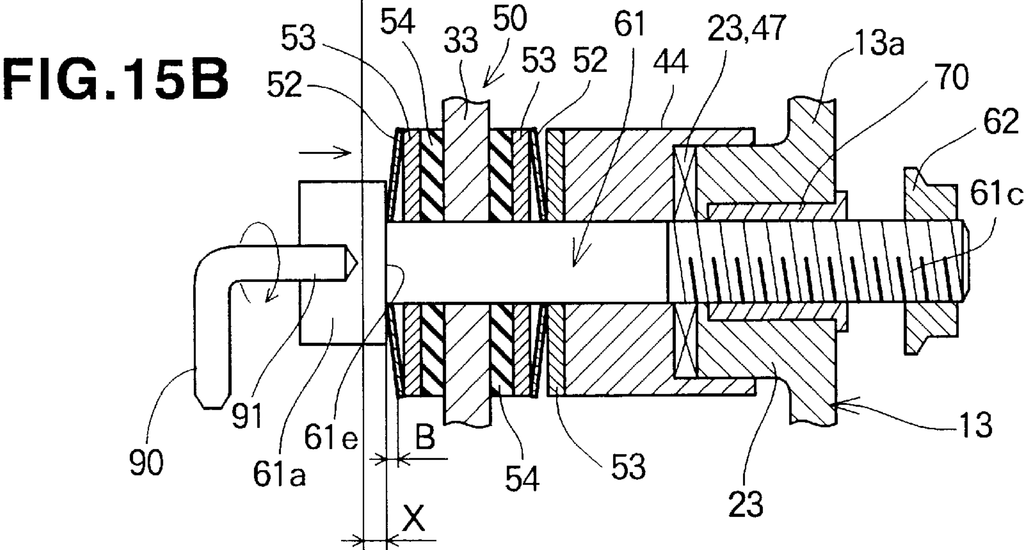
Figure 15C:
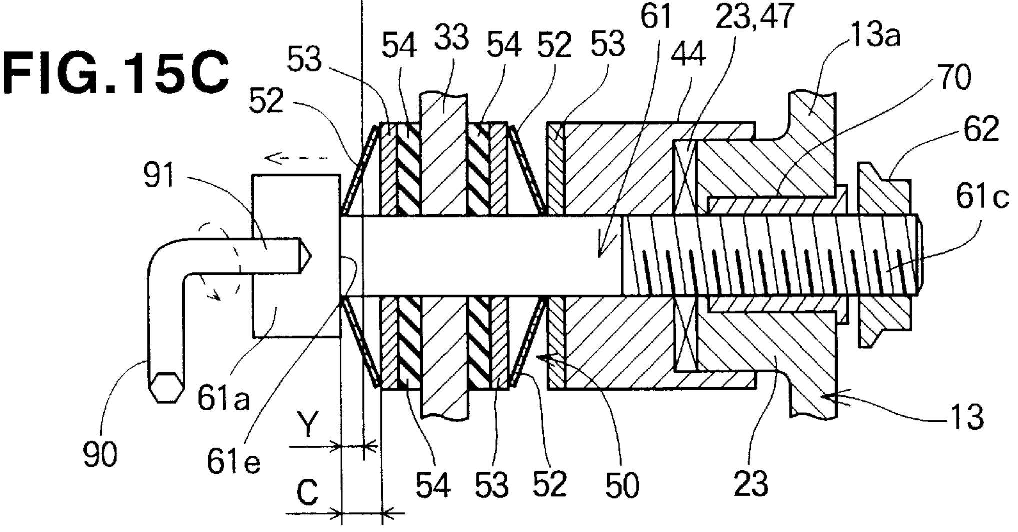

FIGS. 15A–15C illustrate the manner in which a frictional force acting between the rubber ring discs 54 of the throttle-lever holding mechanism 50 and the sector member 55 of the throttle lever 30 is adjusted. In the initial condition (corresponding to the position shown in FIG. 8), the throttle-lever holding mechanism 50 is in the position (neutral position) shown in FIG. 15A.

When the frictional force is to be adjusted, the lock nut 62 is loosened as shown in FIG. 15A. Thus, by turning a hexagonal bar wrench 90 in either direction of the arrow with its one end 91 received in the hexagonal hole 61*d* in the head 61*a* of the support shaft 61, the support shaft 61 is moved right or left relative to the insert nut 70, thus enabling adjustment of the frictional force between the sector member 33 and the rubber ring discs 54. In the neutral position, the conical spring washers 52 have a height A equal to the distance between the under surface 61*e* of the head 61*a* and the metal washer 53.

When the friction between the sector member 33 and the rubber ring discs 54 is to be increased, the support shaft 61 is rotated by the bar wrench 90 in the clockwise direction indicated by the solid-lined arrow shown in FIG. 15A. By virtue of threading engagement between the screw portion 61*c* and the insert nut 70, the support shaft 61 moves rightwards relative to the insert nut 70 and the head member 13 against the forces of the conical spring washers 52, 52, as indicated by the solid-lined arrow shown in FIG. 15B. When the support shaft 61 is displaced rightward by a distance x from the neutral position of FIG. 15A, the conical spring washers 52 are deflected in a somewhat flattened position and has a height B.

With this rightward movement of the support shaft 61, a preloading force exerted on the conical spring washers 52 is increased. Thus, the rubber ring discs 54, 54 are forced by the conical spring washers 52, 52 against the opposite surfaces of the sector member 33 under a greater resilient force than that applied at the initial state. Consequently, the friction between the sector member 33 and the rubber ring discs 52 increases, correspondingly. At the same time, the stationary and movable cams 23, 47 are subjected to a greater force tending to hold them together.

The foregoing friction increasing adjustment is particularly useful when the coefficient of friction of the rubber ring discs 50 becomes small due to aging or deterioration by time. Additionally, the friction can be adjusted only by turning the support shaft 61 to move the same in an axial direction without exerting any adverse effect on another mechanism.

When the friction between the sector member 33 and the rubber ring discs 54 is to be decreased, the support shaft 61 is rotated by the bar wrench 90 in the counterclockwise direction indicated by the broken-lined arrow shown in FIG. 15A. By virtue of threading engagement between the screw portion 61*c* and the insert nut 70, the support shaft 61 moves leftwards relative to the insert nut 70 and the head member 13 under the forces of the conical spring washers 52, 52, as indicated by the broken-lined arrow shown in FIG. 15C. When the support shaft 61 is displaced leftward by a distance Y from the neutral position of FIG. 15A, the conical spring washers 52 are allowed to axially expand and has a height C.

With this leftward movement of the support shaft 61, a preloading force exerted on the conical spring washers 52 is lessened. Thus, the rubber ring discs 54, 54 are forced against the opposite surfaces of the sector member 33 under a smaller resilient force than that applied at the initial state. Consequently, the friction between the sector member 33 and the rubber ring discs 52 decreases, correspondingly. At the same time, the stationary and movable cams 23, 47 are subjected to a smaller force tending to hold them together.

The foregoing friction decreasing adjustment is particularly useful when the initially set friction is too large for the operator to manipulate the throttle lever 30. Likewise the friction increasing adjustment mentioned previously, the friction decreasing operation can be achieved by merely turning the support shaft 61 and does not exert any influence on the operation or another mechanism.

After the foregoing adjustment, the lock nut 62 is threaded over the screw portion 61*c* of the support shaft 61 to lock the support shaft 61 at the desired position relative to the head portion 12 of the operation-control handle 10. With this friction adjustment, it is possible to grip the sector member 33 between the rubber ring discs 52, 52 to frictionally hold the throttle lever 30 in a desired position. At the same time, a force required to turn the lock lever 40 to activate the throttle-lever holding mechanism 50 can be adjusted at a desired value.

Thus, the friction on the throttle lever 40 can be easily adjusted by displacing the support shaft 61 in the axial direction by turning the support shaft 61 in such a manner that the adjusted friction is suited for the operator.

Figure 16:
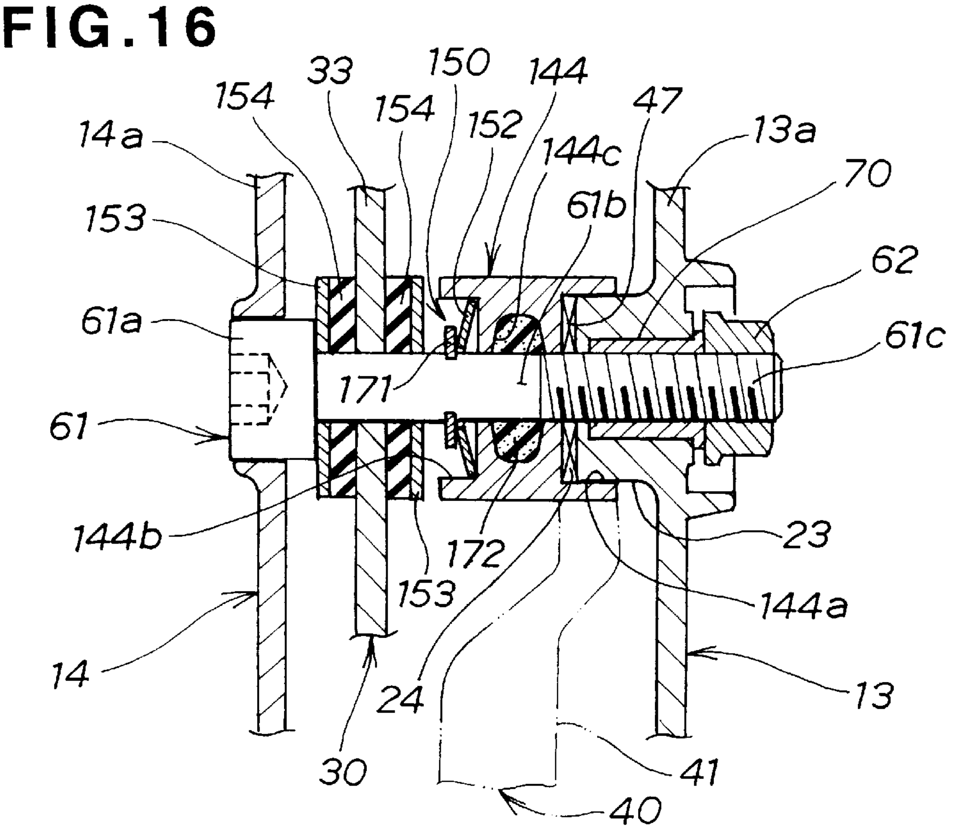
FIG. 16 is a cross-sectional view showing a modified form of the throttle-lever holding mechanism as it is in a releasing position.

FIG. 16 shows a modified form of the throttle-lever holding mechanism 50 according to the present invention, the modified mechanism 150 being in the state corresponding to the standby position of the lock lever 40. In FIG. 16, these parts which are identical to those in the embodiment shown in FIG. 8 are designated by the same reference characters, and further description thereof can, therefore, be omitted.

The modified throttle-lever holding mechanism 150 includes a stationary cam 23 formed integrally with the head member 13, and a movable cam 47 provided at the bottom of a first axial recess 144*a* formed in one end face of a cylindrical head 144 of the lock lever 40. The axial recess 144*a* is slidably fitted over a peripheral surface of the stationary cam 23 which is cylindrical in shape. The cylindrical head 144 further has a second axial recess 144*b* formed in the opposite end face of the cylindrical head 144. A conical spring washer 152 fitted around the shank 61*b* of a support shaft 61 is received in the second axial recess 144*b* and fixed in position by a stop ring 171 attached to the support shaft 61 such that the conical spring washer 152 preloaded between the cylindrical head 144 and the stop ring 171. The conical spring washer 152 urges the cylindrical head 144 rightwards to keep the movable cam 48 in engagement with the stationary cam 23.

The throttle-lever holding mechanism 150 further includes two rubber ring discs (friction members) 154, 154 fitted around the shank 61*b* of the support shaft 61 and disposed on opposite sides of the sector member 33 of the throttle lever 30, and two metal washers 153, 153 fitted around the shank 61*b* and each disposed on the outer side of one of the rubber ring discs 152, 152. One of the metal washers 153 is disposed between the head 61*a* of the support shaft 61 and one of the rubber ring discs 152, and the other metal washer 153 is disposed between the other rubber ring disc 152 and the cylindrical head 144 of the lock lever 40. The cylindrical head 144 further has a central annular third recess 144*c* facing the peripheral surface of the shank 61*b*. The annular recess 172 is filled with an oil-impregnated sponge rubber or O-ring 172.

In the standby position shown in FIG. 16, the metal washer 153 disposed between the sector member 33 and the cylindrical head 144 is separated by a space from the cylindrical head 144. The force of the conical spring washer 152 does not act on the sector member 33 of the throttle lever 30. The throttle lever 30 is held in the standby position of FIG. 5 by the force the return spring 67.

Figure 17:
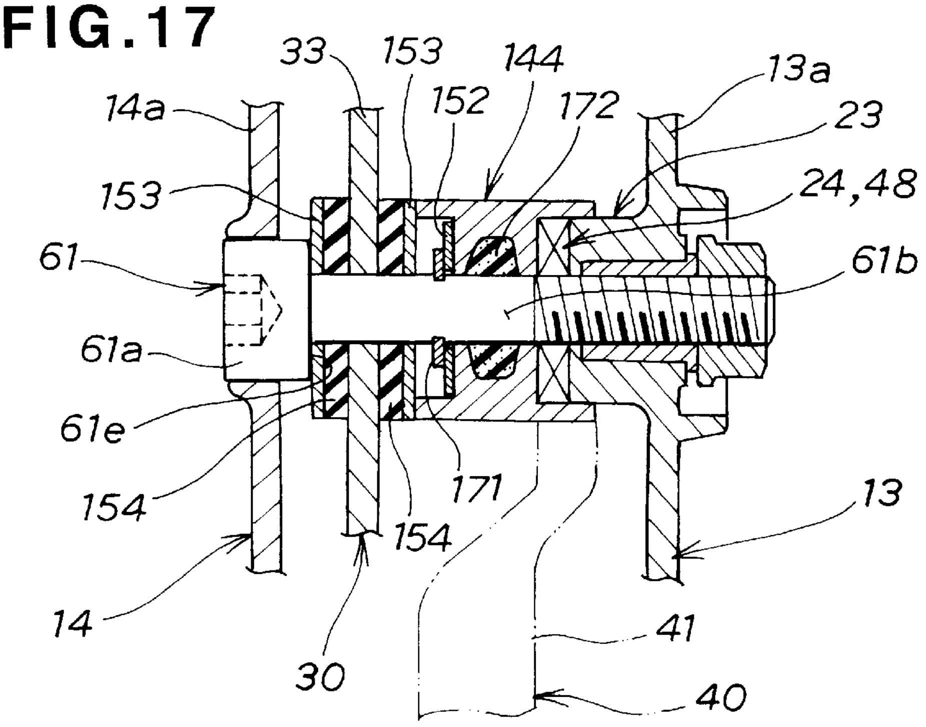
FIG. 17 is a view similar to FIG. 16, but showing the throttle-lever holding mechanism in a locking position.

When the lock lever 40 is depressed as shown in FIG. 9, the cylindrical head 144 turns about an axis of the shank 61*b* of the support shaft 61. The rotational movement of the cylindrical head 144 is translated into an axial leftward movement of the cylindrical head 144, as shown in FIG. 17, by a camming action induced by and between the respective cam surfaces 24, 48 of the stationary and movable cams 23, 47. The cylindrical head 144, as it is displaced leftwards against the resiliency of the conical spring washer 152, comes into abutment with the confronting metal washer 153, then forcing the same washer 153 leftwards. Consequently, the rubber ring discs 154 disposed on opposite sides of the sector member 33 is axially compressed between an under surface 61*e* of the head 61*a* of the support shaft 61 and the cylindrical head 144 of the lock lever 40. Thus, the sector member 33 is firmly gripped between the rubber ring discs 154, 154 with the result that the throttle lever 30 is locked in position against pivotal movement.

With the arrangement of the throttle-lever holding mechanism 150, the throttle lever 30 can be manipulated with a lesser force or pressure than the throttle lever operationally connected with the throttle-lever holding mechanism 50 of the first embodiment. The required manipulating force is at least greater than a combined force of the force of return spring 67 and the biasing force applied to the control cable 37.

The conical spring washers 52, 152 of the throttle-lever holding mechanisms 50, 150 may be replaced with compression coil springs having a small axial length. In the embodiment described above, the operation-control lever unit is used in the carrying bush cutter. The operation-control lever unit according to the present invention may be employed in other engine-powered working machines, such as shown in FIGS. 18–21.

Figure 18:
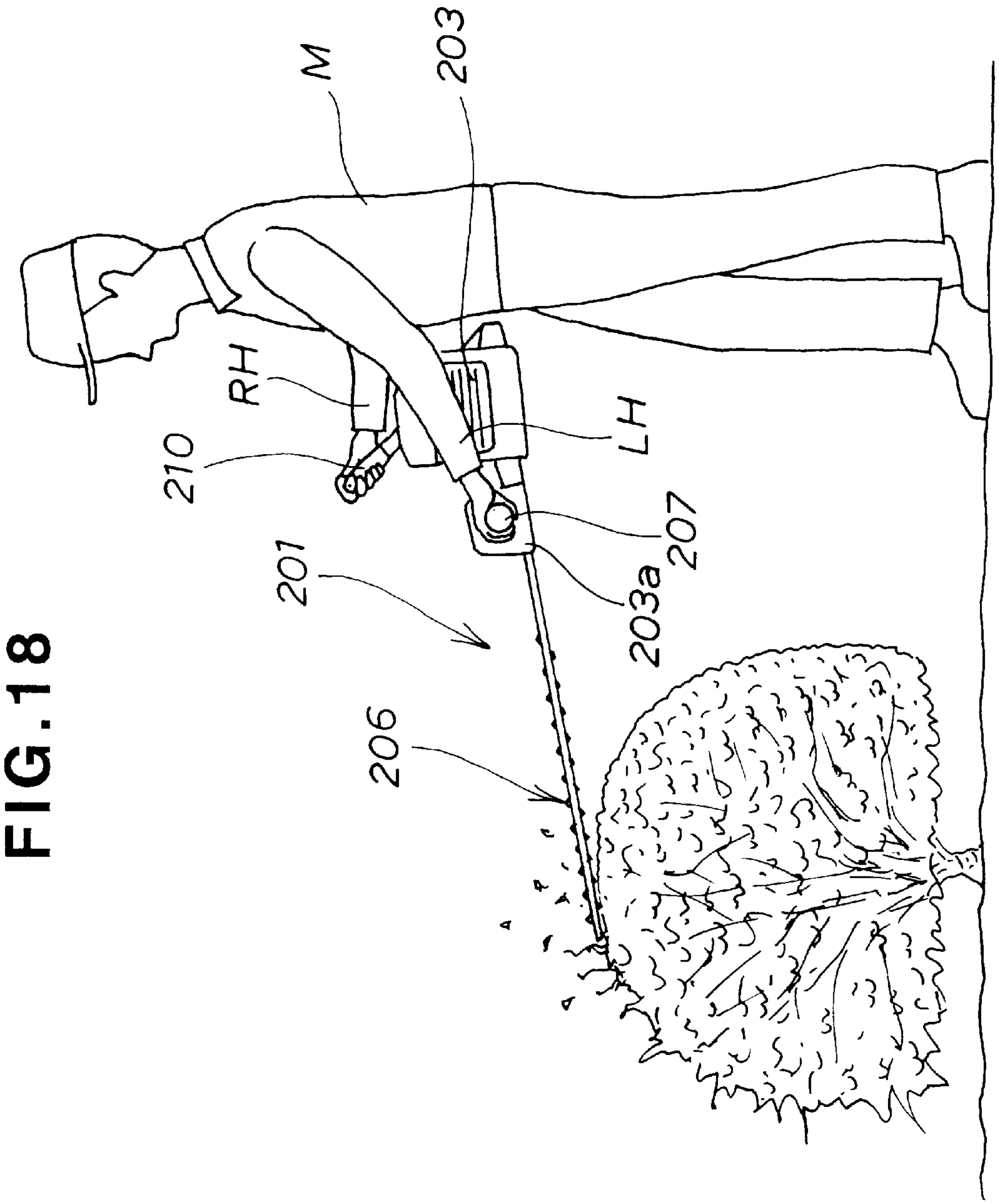
FIGS. 18 to 21 are diagrammatical views showing various modes of application of the engine-powered working machine in which the operating lever unit of the present invention can be used.

FIG. 18 shows a chainsaw 201 driven by an engine 203. The engine-driven chainsaw 201 has a grip handle 210 projecting laterally from a body 203*a* of the chainsaw 201, and an operation handle 210 projecting forwardly and upwardly from the engine 203. The grip handle 207 is gripped by a left hand LH of the operator M, and the operation handle 210 is gripped by a right hand RH of the operator M. The operation handle 210 is equipped with the operation-control lever unit of the present invention described above for controlling rotational speed of the engine 203. The chainsaw 201 has a cutting blade 206 with teeth on an endless chain projecting forwardly from the body 203*a* for trimming trees.

Figure 19:
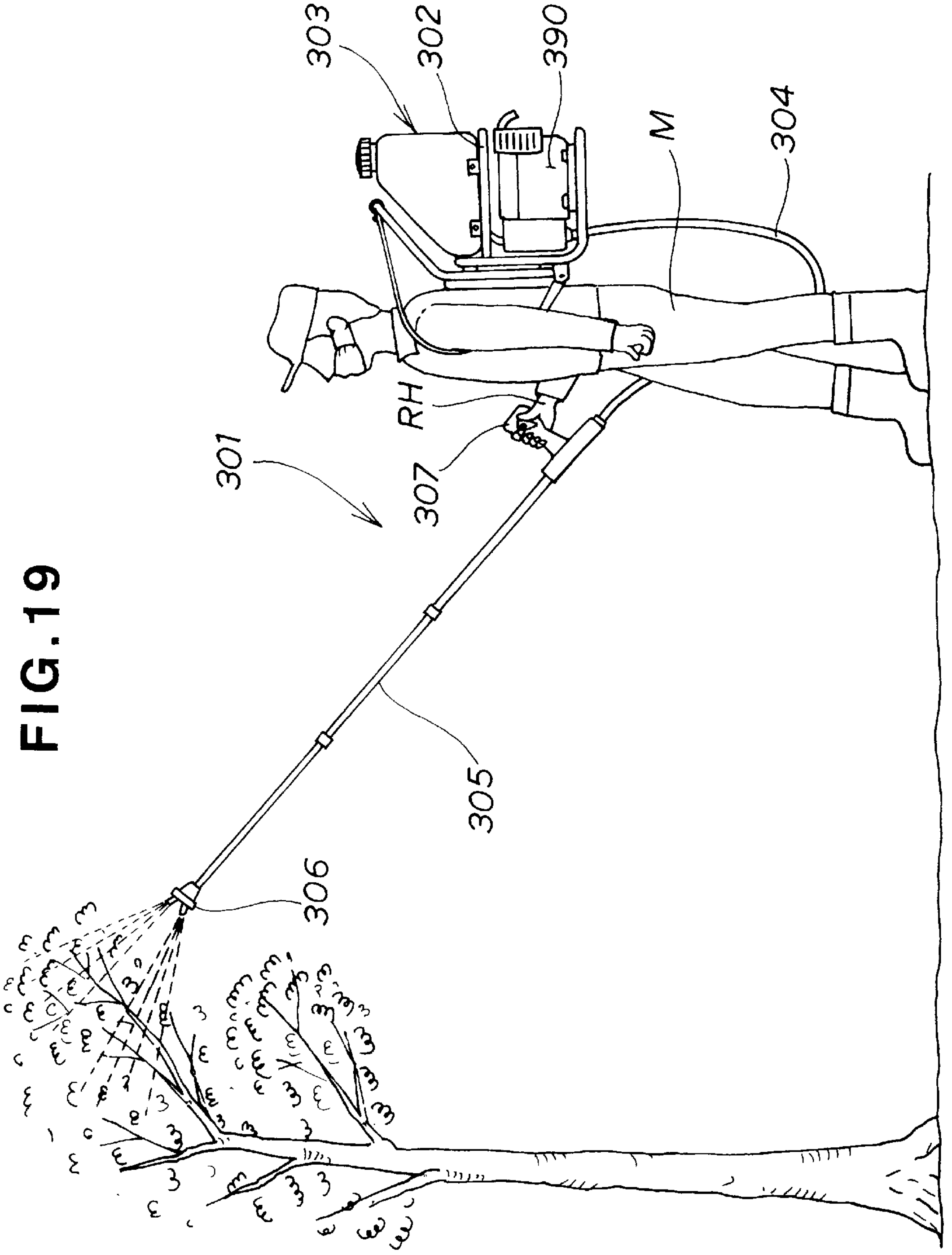

FIG. 19 shows a chemical sprayer 301 driven by an engine 303 carried on the back of the operator M via a frame 302. The frame 302 also carries thereon a chemical tank 390 disposed below the engine 303. The chemical tank 390 has a built-in pump driven by the engine 303. The chemical sprayer 301 has a spray nozzle 306 attached to the top of a rigid pipe 305, and a flexible hose 304 connecting the rear end of the pipe 305 and the chemical tank 390. An operation handle 307 is provided on the rear end of the pipe 305 and is gripped by a right hand of the operator M. The operation handle 307 is equipped with the operation-control lever unit of the present invention described above. The pump driven by the engine 303 forces a chemical fluid to be drawn from the tank 390 and sprayed out from the spray nozzle 306 onto trees and plants.

Figure 20:
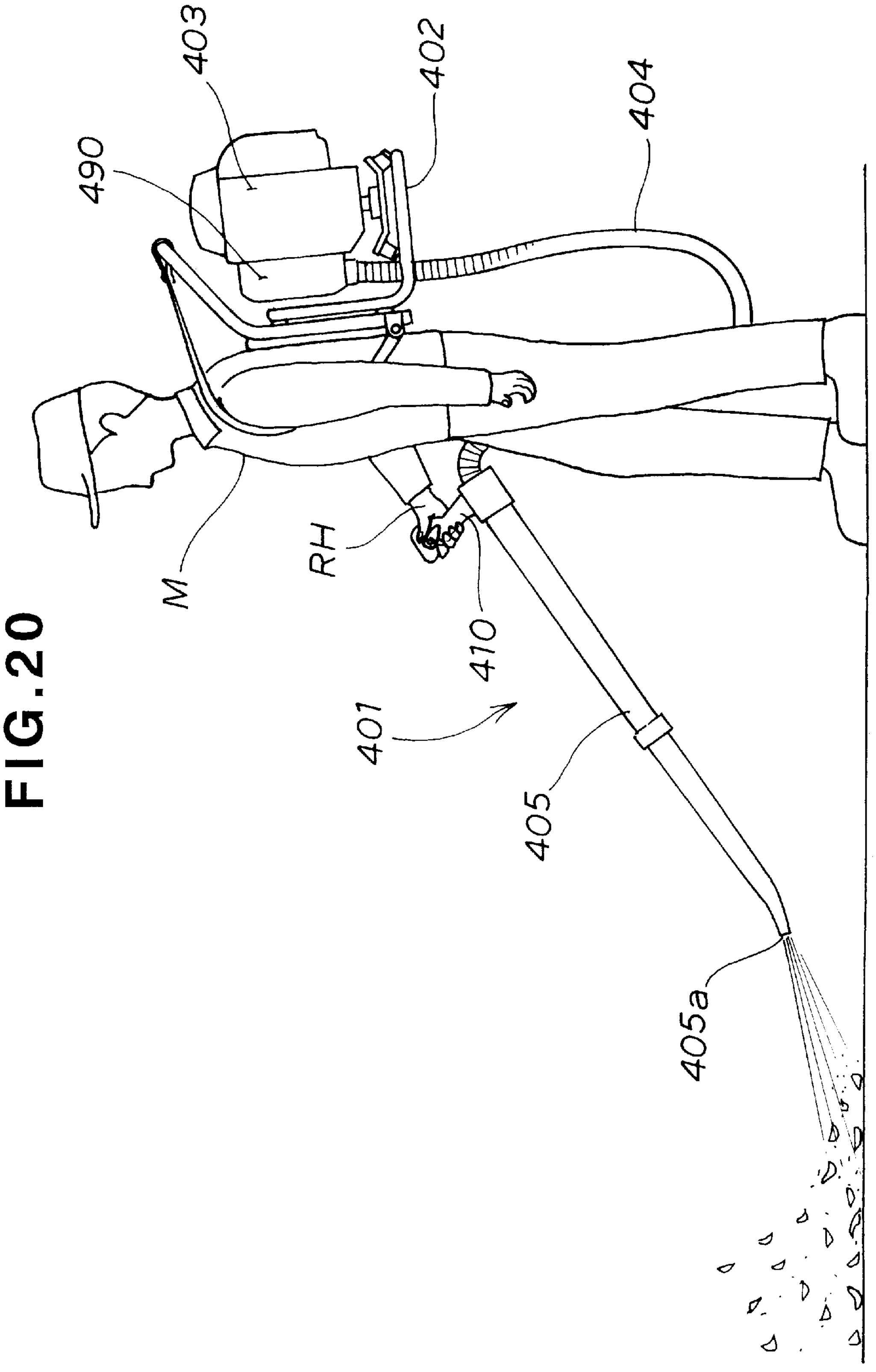

FIG. 20 shows a blower 401 driven by an engine 403 carried on the back of the operator M via a frame 402. The engine-driven blower 401 includes a blower pipe 405 having a nozzle 405*a* at a front end thereof, a flexible hose 404 interconnecting a rear end of the pipe 405 and a compressor 490 driven by the engine 403. An operation handle 410 is provided on a rear end portion of the pipe 405 and gripped by a right hand RH of the operator M. The operation handle 410 is equipped with the operation-control lever unit of the present invention. Pressurized air supplied from the engine-driven compressor 490 is forced out from the nozzle 405*a* to collect dust, leaves, trash on the roads.

Figure 21:
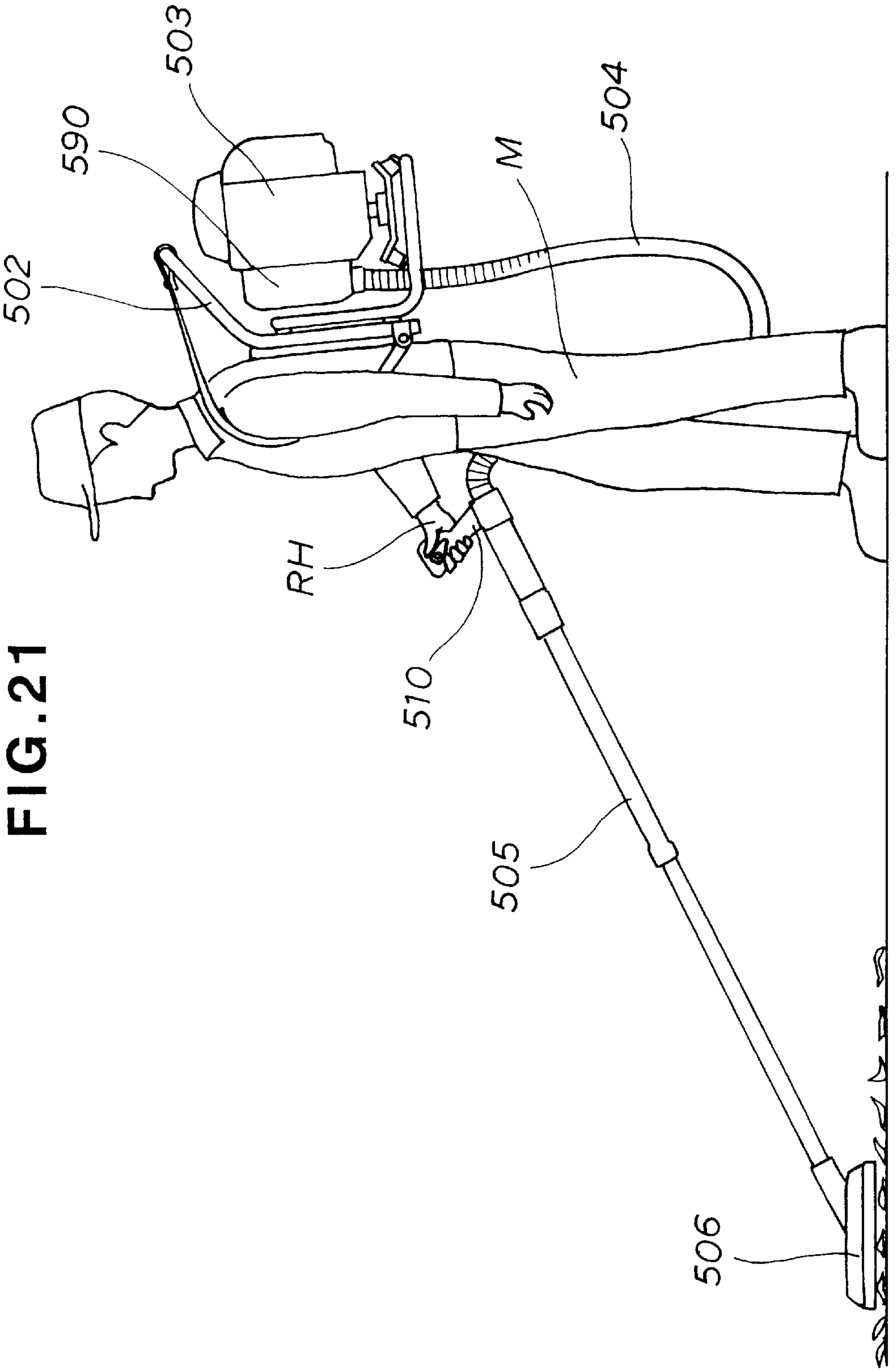

FIG. 21 shows a vacuum dust collector 501 driven by an engine 503 carried on the back of the operator M via a frame 502. The vacuum dust collector 501 includes a vacuum generator 590 driven by the engine 503, a rigid pipe 505 connected to the vacuum generator 590 via a flexible hose 504, and a vacuum attachment 506 attached to a front end of the pipe 505 for collecting, by suction, dust, leaves and trash on the roads. An operation handle 510 is provided on a rear end portion of the pipe 505 and gripped by a right hand RH of the operator M. The operation handle 510 is equipped with the operation-control lever unit of the invention described above.

Obviously, various minor changes and modifications of the present invention are possible in the light of the above teaching. It is therefore to be understood that within the scope of the appended claims the present invention may be practiced otherwise than as specifically described.

What is claimed is:

1. An operation-control lever unit for regulating power of an engine of an engine-powered working machine to control operation of a working tool of the engine-powered working machine, the operation-control lever unit comprising:

- an operation-control handle having a grip portion and an enlarged head portion at an end of the grip portion;
- a throttle lever pivotally mounted to the head portion of the operation-control handle and pivotally movable about a pivot axis of the throttle lever within a predetermined angular range;
- a lock lever pivotally mounted by a support shaft to the head portion of the operation-control handle and pivotally movable about an axis of the support shaft, the lock lever being slidably movable along the axis of the support shaft; and
- a throttle-lever holding mechanism operative in response to pivotal movement of the lock lever in a locking direction to frictionally hold the throttle lever at a desired position within the predetermined angular range, the throttle-lever holding mechanism having a first cam coaxial with the support shaft and formed integrally with the head portion of the operation-control handle, a second cam disposed on the lock lever in coaxial relation with the support shaft and coacting with the first cam to displace the lock lever along the support shaft in a first direction away from the first cam, and resilient means disposed behind the second cam when viewed from the first cam for resiliently urging the second cam toward the first cam.

2. An operation-control lever unit according to claim 1; wherein one of the first and second cams has an integral tubular portion coaxial with the support shaft and projecting toward the other of the first and second cams, the other of the first and second cams having an outer peripheral surface slidably received in the tubular portion.

3. An operation-control lever unit according to claim 1; wherein the first cam has an annular cam surface having at least one radial ridge; and wherein the second cam has an annular cam surface having at least one radial ridge engaged with the at least one ridge of the cam surface of the first cam.

4. An operation-control lever unit according to claim 3; wherein at least one of the at least one ridge of the first cam and the at least one ridge of the second cam has a flat top surface.

5. An operation-control lever unit according to claim 4; wherein the flat top surface is perpendicular to the axis of the support shaft.

6. An operation-control lever unit according to claim 5; wherein the at least one ridge having a flat top surface has a generally trapezoidal cross-sectional shape.

7. An operation-control lever unit according to claim 3; wherein the at least one ridge of the first cam comprises plural ridges, the plural ridges of the first cam being arranged at equal intervals in the circumferential direction of the annular cam surface of the first cam; and wherein the at least one ridge of the second cam comprises plural ridges, the plural ridges of the second cam being arranged at equal intervals in the circumferential direction of the annular cam surface of the second cam.

8. An operation-control lever unit according to claim 7; wherein at least one of the plural ridges of the first cam or at least one of the plural ridges of the second cam has a flat top surface.

9. An operation-control lever unit according to claim 8; wherein the flat top surface is perpendicular to the axis of the support shaft.

10. An operation-control lever unit according to claim 9; wherein the plural ridges of the first cam or the plural ridges of the second cam have a generally trapezoidal cross-sectional shape.

11. An operation-control lever unit according to claim 1; wherein the throttle-lever holding mechanism has a first friction member disposed between the throttle lever and the lock lever and forced against the throttle lever when coaction between the first and second cams displaces the lock lever in the first direction against the resiliency of the resilient means.

12. An operation-control lever unit according to claim 11; wherein the throttle-lever holding mechanism has a second friction member disposed opposite to the first friction member with the throttle lever disposed therebetween, the first friction member and the second friction member cooperating to grip the throttle lever therebetween when the lock lever is displaced in the first direction.

13. An operation-control lever unit according to claim 12; wherein the first friction member and the second friction member comprise rubber ring discs mounted on the support shaft.

14. An operation-control lever unit according to claim 11; wherein the resilient means is disposed between the lock lever and the first friction member for urging the lock lever in a second direction to move the second cam toward the first cam and for urging the friction member into contact with the throttle lever.

15. An operation-control lever unit according to claim 14; wherein the resilient means comprises a conical spring washer mounted on the support shaft.

16. An operation-control lever unit according to claim 12; wherein the resilient means comprises a first resilient member disposed between the lock lever and the first friction member, and a second resilient member disposed between the second friction member and a portion of the support shaft; wherein the first resilient member urges the lock lever in a second direction to move the second cam toward the first cam and urges the first friction member into contact with the throttle lever; and wherein the second resilient member urges the second friction member into contact with the throttle lever.

17. An operation-control lever unit according to claim 16; wherein the first and second resilient members comprise conical spring washers mounted on the support shaft.

18. An operation-control lever unit according to claim 11; wherein the resilient means is disposed between the lock lever and the first friction member for urging the lock lever in a second direction to move the second cam toward the first cam, the resilient means being operatively separated from the friction member.

19. An operation-control lever unit according to claim 18; wherein the throttle-lever holding mechanism has a second friction member disposed opposite to the first friction member with the throttle lever disposed therebetween, the first friction member and the second friction member cooperating to grip the throttle lever therebetween when the lock lever is displaced in the first direction.

20. An operation-control lever unit according to claim 19; wherein the first friction member and the second friction member comprise rubber ring discs mounted on the support shaft.

21. An operation-control lever unit according to claim 18; wherein the resilient means comprises a conical spring washer mounted on the support shaft.

22. An operation-control lever unit according to claim 11; wherein the resilient means is disposed between the lock lever and the first friction member and wherein the throttle-lever holding mechanism has a friction adjustment device for varying a preloading force on the resilient means to adjust a frictional force acting between the throttle lever and the friction member.

23. An operation-control lever unit according to claim 22; wherein the support shaft comprises a screw forming the friction adjustment device and having a head slidably guided in a first portion of the head portion of the handle and a shank including a screw portion threaded with a second portion of the head portion; and wherein the resilient means, the friction member and the throttle are disposed between the head of the screw and the lock lever.

24. An operation-control lever unit according to claim 22; wherein the throttle-lever holding mechanism has a second friction member disposed between the throttle lever and the head of the screw; and wherein the friction member and the second friction member cooperate to grip the throttle lever therebetween when the lock lever is displaced in the first direction.

25. An operation-control lever unit according to claim 23; wherein the screw comprises a hexagonal socket head cap screw.

26. An operation-control lever unit according to claim 23; wherein the friction adjustment device has a lock nut threaded with the screw portion of the screw to lock the screw in a position against movement relative to the head portion.

27. An operation-control lever unit comprising: a handle having a head portion at one end thereof; a throttle lever mounted to the head portion of the handle for undergoing pivotal movement within a predetermined angular range; a lock lever mounted to the head portion of the handle by a support shaft for undergoing pivotal movement about and sliding movement along an axis of the support shaft; and holding means operative in response to pivotal movement of the lock lever in a locking direction to frictionally hold the throttle lever at a desired position within the predetermined angular range, the holding means comprising a first cam coaxial with the support shaft and integral with the head portion of the handle, a second cam disposed on the lock lever in coaxial relation with the support shaft and coacting with the first cam to displace the lock lever along the support shaft in a first direction away from the first cam, and a biasing member for biasing the second cam toward the first cam.

28. An operation-control lever unit according to claim 27; wherein one of the first and second cams has an integral tubular portion coaxial with the support shaft and projecting toward the other of the first and second cams; and wherein the other of the first and second cams has an outer peripheral surface slidably received in the tubular portion.

29. An operation-control lever unit according to claim 27; wherein the first cam has an annular cam surface having at least one radial ridge; and wherein the second cam has an annular cam surface having at least one radial ridge engaged with the at least one radial ridge of the cam surface of the first cam.

30. An operation-control lever unit according to claim 27; wherein the holding means further comprises a first friction member disposed between the throttle lever and the lock lever and forced against the throttle lever when coaction between the first and second cams displaces the lock lever in the first direction against the biasing force of the biasing member.

31. An operation-control lever unit according to claim 30; wherein the holding means further comprises a second friction member disposed opposite to the first friction member with the throttle lever disposed therebetween, the first friction member and the second friction member cooperating to grip the throttle lever therebetween when the lock lever is displaced in the first direction.

32. An operation-control lever unit according to claim 31; wherein the first friction member and the second friction member comprise rubber ring discs mounted on the support shaft.

* * * * *